US011553540B2

(12) United States Patent
Liu et al.

(10) Patent No.: US 11,553,540 B2
(45) Date of Patent: Jan. 10, 2023

(54) DATA PROCESSING METHOD AND DEVICE

(71) Applicant: HUAWEI TECHNOLOGIES CO., LTD., Shenzhen (CN)

(72) Inventors: Jing Liu, Shanghai (CN); Yuanping Zhu, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/094,823

(22) Filed: Nov. 11, 2020

(65) Prior Publication Data
US 2021/0068177 A1 Mar. 4, 2021

Related U.S. Application Data

(63) Continuation of application No. PCT/CN2019/086456, filed on May 10, 2019.

(30) Foreign Application Priority Data

May 11, 2018 (CN) .......................... 201810450350.6

(51) Int. Cl.
*H04W 76/12* (2018.01)
*H04W 28/02* (2009.01)
(Continued)

(52) U.S. Cl.
CPC ....... *H04W 76/12* (2018.02); *H04W 28/0257* (2013.01); *H04W 84/047* (2013.01); *H04W 88/085* (2013.01); *H04W 92/12* (2013.01)

(58) Field of Classification Search
None
See application file for complete search history.

(56) References Cited

U.S. PATENT DOCUMENTS

2019/0150187 A1   5/2019  Park et al.

FOREIGN PATENT DOCUMENTS

| CN | 107852363 A | 3/2018 |
| CN | 107872876 A | 4/2018 |
| WO | 2017010693 A1 | 1/2017 |

OTHER PUBLICATIONS

3GPP TSG-RAN WG2, NR control plane latency analysis for UE initial access in IAB scenario, Apr. 16-20, 2018_R2-1806152 (Year: 2018).*

(Continued)

*Primary Examiner* — Yemane Mesfin
*Assistant Examiner* — Jeff Banthrongsack

(57) ABSTRACT

This application provides a data processing method and device, to implement bearer mapping of control plane signaling of user equipment on each interface. An IAB system includes a centralized unit CU, a distributed unit DU, a first IAB node, and a second IAB node. The method includes: generating, by the CU, a downlink F1AP message, where a message included in the downlink F1AP message is one or a combination of the following: an F1AP message of a terminal device, an F1AP message of the first IAB node, and an RRC message of the second IAB node; and sending, by the CU, the downlink F1AP message to the DU, and indicating that a message type of the message included in the downlink F1AP message is one of the following: an RRC message type, an F1AP message type, or an RRC message type and an F1AP message type.

16 Claims, 13 Drawing Sheets

(51) Int. Cl.
  *H04W 92/12* (2009.01)
  *H04W 84/04* (2009.01)
  *H04W 88/08* (2009.01)

(56) References Cited

OTHER PUBLICATIONS

3GPP TSG-RAN WG3, Discussions on control plane protocol for IAB, Apr. 16-20, 2018_R2-181875 (Year: 2018).*
3GPP TSG-RAN WG3, Usage of tunneling of forwarding on the IAB backhaul, Feb. 26-Mar. 2, 2018_R3-181314 (Year: 2018).*
HUAWEI: "NR control plane latency analysis for UE initial access in IAB scenario", 3GPP Draft; R2-1806152, Apr. 14, 2018; XP051429720,total 10 pages.
SAMSUNG: "Discussions on control plane protocol for IAB", 3GPP Draft; R3-181875,Apr. 15, 2018; XP051430040, total 5 pages.
LG Electronics Inc: "F1 message transport between IAB Donor and IAB Node", 3GPP Draft; R3-182083,Apr. 15, 2018; XP051430240,total 3 pages.
ERICSSON: "Usage of tunnelling or forwarding on the IAB backhaul", 3GPP Draft; R3-181314,Feb. 17, 2018; XP051401758,total 6 pages.
ERICSSON:"Setup procedures for IAB-node and a UE connected to an IAB node",3GPP Draft; R2-1806817,May 10, 2018, XP051463872,total 8 pages.
European Search Report for Application No. 19799483.3 dated May 11, 2021, 20 pages.
LG Electronics Inc.,"Transmission of RRC message via CU-DU interface", 3GPP TSG-RAN WG3 Meeting #95, R3-170405, Athens, Greece, Feb. 13, 2017-Feb. 17, 2017, total 4 pages.
Huawei, HiSilicon, Consideration on IAB Scenarios and Use Cases. 3GPP TSG-RAN WG2 Ad Hoc, Vancouver, Canada, 22, Jan. 26, 2017, R2-1801130, 4 pages.
Chinese Office Action for Application No. 201810450350.6 dated Aug. 3, 2022, 20 pages.

* cited by examiner

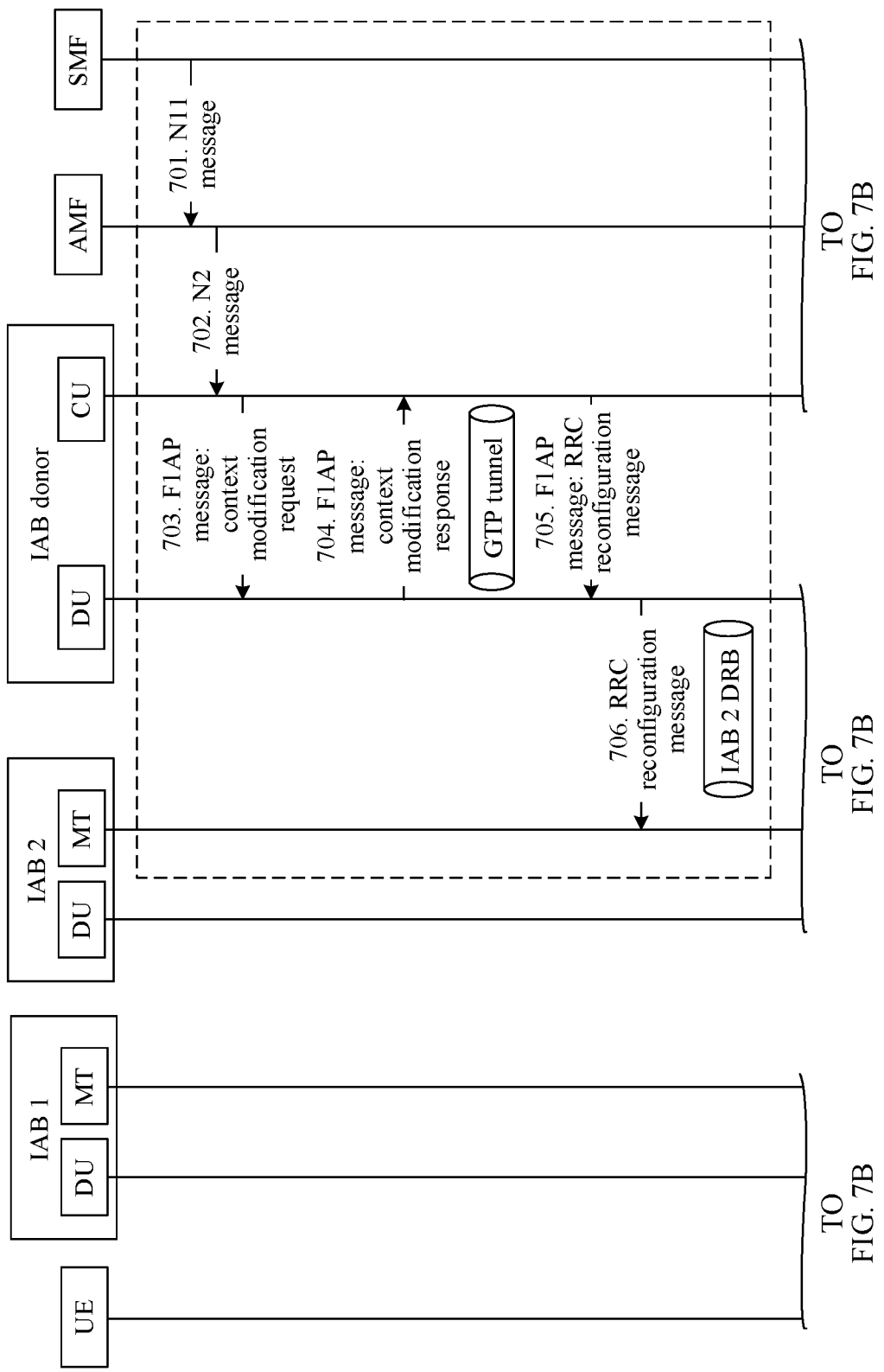

DATA PROCESSING METHOD AND DEVICE

CROSS-REFERENCE TO RELATED APPLICATIONS

This application is a continuation of International Application No. PCT/CN2019/086456, filed on May 10, 2019, which claims priority to Chinese Patent Application No. 201810450350.6, filed on May 11, 2018, The disclosures of the aforementioned applications are hereby incorporated by reference in their entireties.

TECHNICAL FIELD

This application relates to the communications field, and more specifically, to a data processing method and device in the communications field.

BACKGROUND

To ensure deployment and application of a future cellular network, a technology that supports wireless backhaul can provide more flexible and dense deployment of NR cells. This technology is an integrated access and backhaul (IAB) technology. A 5th generation (5G) new radio (NR) technology can provide a bandwidth larger than that in a long term evolution (LTE) technology. Therefore, in NR, the wireless backhaul may provide extended coverage for an NR cell, and may also provide capacity enhancement for the NR cell.

An IAB network architecture mainly includes user equipment, one or more relay nodes, a donor base station, and a core network. The relay node may be a relay node or an IAB node. The donor base station may be a donor gNB or an IAB donor. A link between the user equipment and the relay node is referred to as a radio access link, a link between relay nodes and a link between the relay node and the donor base station are both referred to as a wireless backhaul link, and the donor base station is connected to a core network through an NG interface.

Further, both the donor base station and the relay node in the IAB network architecture may use an architecture in which a centralized unit (CU) and a distributed unit (DU) are separated, that is, the donor base station may include a CU and a DU, where the CU is connected to the DU through an F1 interface, and the CU is connected to the core network through the NG interface. The relay node includes one DU and one MT (Mobile Termination). The DU of the relay node communicates with the CU of the donor base station through an air interface link. Therefore, how to implement bearer mapping of control plane signaling and user plane data of the user equipment on each interface in the IAB architecture is a problem that urgently needs to be resolved.

SUMMARY

This application provides a data processing method and device, to implement bearer mapping of control plane signaling and user plane data of user equipment on each interface.

According to a first aspect, a data processing method in an integrated access and backhaul IAB system is provided. The system includes a centralized unit CU, a distributed unit DU, a first IAB node, and a second IAB node, and the method includes:

generating, by the CU, a downlink F1AP message, where a message included in the downlink F1AP message is one or a combination of the following: an F1AP message of a terminal device, an F1AP message of the first IAB node, and an RRC message of the second IAB node; and sending, by the CU, the downlink F1AP message to the DU, and indicating that a message type of the message included in the downlink F1AP message is one of the following: an RRC message type, an F1AP message type, or an RRC message type and an F1AP message type.

Correspondingly, the DU receives the downlink F1AP message, and determines that the message type of the message included in the downlink F1AP message is one of the following: the RRC message type, the F1AP message type, or the RRC message type and the F1AP message type.

Therefore, in this embodiment of this application, the CU and the DU in an IAB donor may perform bearer mapping and processing on control plane signaling based on a message type of a transmitted message or based on a message type of a message included in a transmitted message.

In some possible implementations of the first aspect, the indicating, by the CU, a message type of the message included in the downlink F1AP message includes:

sending, by the CU, indication information to the DU, where the indication information indicates the message type; and the indication information is carried in the downlink F1AP message or carried on a peer adaptation layer on an F1 interface between the CU and the DU. Correspondingly, the DU obtains the indication information.

Therefore, in this embodiment of this application, the CU sends, to the DU, the indication information used to indicate the type of the message included in the F1AP message, so that the DU can map decapsulated data packets onto different bearers based on types of different messages included in the IAB 2-associated F1AP message. In this way, the DU performs bearer mapping on control plane signaling.

In some possible implementations of the first aspect, the CU sends the downlink F1AP message through a GTP tunnel specific to the F1AP message type to the DU, to indicate to the DU that the downlink F1AP message is transmitted through the GTP tunnel. Correspondingly, the DU receives the downlink F1AP message through the GTP tunnel, and determines that the downlink F1AP message is transmitted through the GTP tunnel. In this way, the DU may determine the F1AP message type based on a specific GTP tunnel bearer on a wired interface.

Specifically, when a message type of a message included in the downlink F1AP message is the RRC message, the CU sends the first message to the DU on a control plane bearer on the wired interface between the CU and the DU; when a message type of a message included in the downlink F1AP message is the F1AP message, the CU sends the first message to the DU on a user plane bearer (for example, the GTP tunnel) between the CU and the DU.

According to a second aspect, a data processing method in an integrated access and backhaul IAB system is provided. The system includes a centralized unit CU, a distributed unit DU, a first IAB node, and a second IAB node, and the method includes:

receiving, by the CU, an uplink F1AP message sent by the DU, where a message included in the uplink F1AP message is one or a combination of the following: an F1AP message of a terminal device, an F1AP message of the first IAB node, and an RRC message of the second IAB node. Correspondingly, the DU sends the uplink F1AP message to the CU.

In this embodiment of this application, the CU and the DU in an IAB donor may perform bearer mapping and processing on control plane signaling based on a message type of a transmitted message or based on a message type of a message included in a transmitted message.

In some possible implementations of the second aspect, the CU receives indication information sent by the DU, where the indication information indicates that a message type of the message included in the uplink F1AP message is one of the following: an RRC message type, an F1AP message type, or an RRC message type and an F1AP message type. Correspondingly, the DU sends the indication information to the CU. In this way, the DU sends, to the CU, the indication information used to indicate the type of the message included in the F1AP message, so that the CU can send decapsulated messages to different processing layers based on types of different messages included in the F1AP message, thereby implementing bearer mapping of control plane signaling.

In some possible implementations of the second aspect, the CU determines, based on a bearer on which the uplink F1AP message is received, a type of a message included in the uplink F1AP message. When obtaining the uplink F1AP message on a control plane bearer on a wired interface between the CU and the DU, the CU determines that the message type of the message included in the uplink F1AP message is the RRC message; when obtaining the uplink F1AP message on a user plane bearer (for example, a GTP tunnel) between the CU and the DU, the CU determines that the message type of the message included in the uplink F1AP message is the F1AP message.

In some possible implementations of the second aspect, the indication information is carried in the uplink F1AP message or on a peer adaptation layer on an F1 interface between the CU and the DU.

In some possible implementations of the second aspect, the method further includes:

when the message type of the message included in the uplink F1AP message is the RRC message type, obtaining, by the CU, the RRC message of the second IAB node, and processing the RRC message of the second IAB node on a peer RRC layer between the CU and the second IAB node.

In some possible implementations of the second aspect, the method further includes:

when the message type of the message included in the uplink F1AP message is the F1AP message type, obtaining, by the CU, an F1AP message included in the uplink F1AP message, and determining that the F1AP message included in the uplink F1AP message is the F1AP message of the terminal device or the F1AP message of the first IAB node.

In some possible implementations of the second aspect, the method further includes:

if the F1AP message included in the uplink F1AP message is the F1AP message of the terminal device, processing, by the CU, the F1AP message of the terminal device on a peer F1AP layer between the CU and the terminal device; or if the F1AP message included in the uplink F1AP message is the F1AP message of the first IAB node, processing, by the CU, the F1AP message of the first IAB node on a peer F1AP layer between the CU and the first IAB node.

Optionally, in this embodiment of this application, the CU may receive a node identifier sent by the DU, and determine, based on the node identifier, that the F1AP message included in the uplink F1AP message is the F1AP message of the terminal device or the F1AP message of the first IAB node.

Optionally, in this embodiment of this application, the CU may determine, based on routing information of the F1AP message, that the F1AP message included in the uplink F1AP message is the F1AP message of the terminal device or the F1AP message of the first IAB node.

Correspondingly, the DU sends the node identifier to the CU. In some possible implementations, the node identifier may be carried in the uplink F1AP message, or carried on an adaptation layer above a F1AP layer of the DU and the F1AP layer of the DU is peer to a F1AP layer of the IAB node 2.

According to a third aspect, a data processing method in an integrated access and backhaul IAB system is provided. The system includes a centralized unit CU, a distributed unit DU, a first IAB node, and a second IAB node, and the method includes:

receiving, by the second IAB node, a downlink message sent by the DU, and when the downlink message is carried on a signaling radio bearer between the second IAB node and the DU, further receiving, by the second IAB node, indication information sent by the DU, where the indication information indicates that a message type of the downlink message is an RRC message type or an F1AP message type; and determining, by the second IAB node based on the received downlink message, whether the downlink message belongs to the second IAB node, and if the downlink message belongs to the second IAB node, processing, by the second IAB node, the downlink message; otherwise, further routing, by the second IAB node, the received downlink message to a next-hop node for processing.

Correspondingly, the DU sends the downlink message to the second IAB node, and when the downlink message is carried on the signaling radio bearer between the second IAB node and the DU, the DU further sends the indication information to the second IAB node, where the indication information indicates that the message type of the downlink message is the RRC message type or the F1AP message type.

Therefore, in this embodiment of this application, the IAB node 2 may perform bearer mapping and processing on control plane signaling based on a message type of a transmitted message or based on a message type of a message included in a transmitted message.

In some possible implementations of the third aspect, when obtaining the downlink message on the signaling radio bearer between the second IAB node and the DU, the second IAB node may determine that the downlink message is the RRC message of the second IAB node.

When obtaining the first message on a dedicated radio bearer or a data radio bearer between the second IAB node and the DU, the second IAB node may determine that the downlink message does not belong to the second IAB node. In this case, the second IAB node may determine that the downlink message includes an F1AP message.

Correspondingly, when determining that the downlink message is the RRC message of the second IAB node, the DU sends the downlink message on the signaling radio bearer. When determining that the downlink message is the F1AP message, the DU sends the downlink message on the dedicated radio bearer or the data radio bearer between the DU and the second IAB node.

Therefore, in this embodiment of this application, the RRC message is transmitted on the SRB, and the F1AP message is transmitted on the dedicated RB (a dedicated data radio bearer or a dedicated signaling radio bearer) or the data radio bearer, so that an IAB node can determine a message type of an obtained message, and further perform bearer mapping on control plane signaling based on different message types.

In some possible implementations of the third aspect, the second IAB node may obtain first indication information sent by the DU, where the first indication information is used to indicate the type of the downlink message. Correspondingly, the DU sends the first indication information to the second IAB node. In this way, the DU sends the indication information to the second IAB node, so that the IAB node can obtain the message type of the downlink message, and further perform bearer mapping on control plane signaling based on different message types.

In some possible implementations of the third aspect, when determining that the downlink message belongs to the second IAB node, the second IAB node determines that the message type of the downlink message is the RRC message, and the second IAB node obtains the RRC message, and sends the RRC message to an RRC layer of the second IAB node for processing.

In some possible implementations of the third aspect, when the message type of the downlink message is the F1AP message, the second IAB node determines a target routing node of the F1AP message based on routing information of the F1AP message.

When the target routing node is a next-hop node in a downlink direction of the second IAB node, the first IAB node processes the downlink message to obtain a second RRC message, and maps the second RRC message onto a radio bearer between the second IAB node and the next-hop node; or when the target routing node is not the next-hop node, the second IAB node maps the downlink message onto the radio bearer between the second IAB node and the next-hop node.

In some possible implementations, when the message type of the downlink message is the F1AP message, the method further includes:

obtaining, by the second IAB node, second indication information, where the second indication information is used to indicate whether the second IAB node needs to process a first F1AP message. In an implementation, the second indication information is sent by the DU to the second IAB node.

When the second indication information is used to indicate that the second IAB node needs to process the downlink message, the second IAB node processes the downlink message to obtain a third RRC message, and maps the third RRC message onto the radio bearer between the second IAB node and the next-hop node.

When the second indication information is used to indicate that the second IAB node does not need to process the downlink message, the second IAB node maps the downlink message onto the radio bearer between the second IAB node and the next-hop node.

According to a fourth aspect, a data processing method in an integrated access and backhaul IAB system is provided. The system includes a centralized unit CU, a distributed unit DU, a first IAB node, and a second IAB node, and the method includes:

sending, by the second IAB node, an uplink message to the DU; and if the uplink message is carried on a signaling radio bearer between the second IAB node and the DU, indicating, by the second IAB node, that a message type of the uplink message is an RRC message type or an F1AP message type to the DU.

Therefore, in this embodiment of this application, an IAB node 2 may perform bearer mapping and processing on control plane signaling based on a message type of a transmitted message or based on a message type of a message included in a transmitted message.

In a possible implementation of the fourth aspect, when the uplink message is an RRC message, the second IAB node maps the RRC message onto the signaling radio bearer between the second IAB node and the DU; or when the uplink message is an F1AP message, the second IAB node maps the uplink message onto a dedicated radio bearer or a data radio bearer between the second IAB node and the DU.

Correspondingly, when receiving, on the signaling radio bearer between the second IAB node and the DU, the uplink message sent by the second IAB node, the DU may determine that the uplink message is the RRC message. When receiving, on the dedicated radio bearer or the data radio bearer between the second IAB node and the DU, the uplink message sent by the second IAB node, the DU may determine that the uplink message is the F1AP message.

Therefore, in this embodiment of this application, the RRC message is transmitted on the SRB, and the F1AP message is transmitted on the dedicated RB (a dedicated data radio bearer or a dedicated signaling radio bearer) or the data radio bearer, so that an IAB node can determine a message type of an obtained message, and further perform bearer mapping on control plane signaling based on different message types.

In a possible implementation of the fourth aspect, the second IAB node maps the uplink message onto the same signaling radio bearer between the second IAB node and the DU, and sends third indication information to the DU, where the third indication information is used to indicate a message type of a message transmitted on the signaling radio bearer, and the message type includes the RRC message or the F1AP message. Correspondingly, the DU receives the third indication information. In this way, the second IAB node sends the indication information to the DU, so that the DU can obtain the message type of the uplink message, and further perform bearer mapping on control plane signaling based on different message types.

According to a fifth aspect, a data processing method in an integrated access and backhaul IAB system is provided. The system includes a centralized unit CU, a distributed unit DU, a first IAB node, and a second IAB node, and the method includes:

determining, by the CU, a mapping relationship between a data radio bearer DRB on an air interface and a DRB on a first interface and a mapping relationship between the DRB on the first interface and a DRB on a second interface based on a QoS parameter of service data, where the first interface is an interface between the first IAB node and the second IAB node, and the second interface is an interface between the second IAB node and the DU; and notifying, by the CU, the first IAB node of the mapping relationship between the DRB on the air interface and the DRB on the first interface, and notifying the second IAB node of the mapping relationship between the DRB on the first interface and the DRB on the second interface.

Therefore, in this embodiment of this application, the CU may perform QoS mapping management on all interface links, and send bearer mapping relationships of the interfaces to the first IAB node and the second IAB node, so that the first IAB node and the second IAB node can perform bearer mapping on user plane data based on respective mapping relationships received by the first IAB node and the second IAB node.

According to a sixth aspect, a data processing method in an integrated access and backhaul IAB system is provided. The system includes a centralized unit CU, a distributed unit DU, a first IAB node, and a second IAB node, and the method includes:

determining, by the CU, a mapping relationship between a data radio bearer DRB on an air interface and a DRB on a first interface and a mapping relationship between the DRB on the first interface and a DRB on a second interface based on a QoS parameter of service data, where the first interface is an interface between the first IAB node and the second IAB node, and the second interface is an interface between the second IAB node and the DU; and notifying, by the CU, the second IAB node of the mapping relationship between the DRB on the air interface and the DRB on the first interface and the mapping relationship between the DRB on the first interface and the DRB on the second interface.

Therefore, in this embodiment of this application, the CU may perform QoS mapping management on all interface links, and send bearer mapping relationships of the interfaces to the second IAB node, so that the second IAB node can perform bearer mapping on user plane data based on a mapping relationship received by the second IAB node.

In this case, the second IAB node may send indication information to the first IAB node based on the received mapping relationship, where the indication information is used to indicate the first IAB node to perform user plane bearer mapping. In an example, the indication information may be an identifier DRB ID of a UE DRB. The first IAB node maps, based on the indication information, user data received on an IAB 1 DRB onto the corresponding UE DRB. In this way, the first IAB node performs bearer mapping on the user plane data.

According to a seventh aspect, a data processing method in an integrated access and backhaul IAB system is provided. The system includes a centralized unit CU, a distributed unit DU, a first IAB node, and a second IAB node, and the method includes:

receiving, by the first IAB node from the CU, a DRB on a first interface and a QoS parameter corresponding to the DRB, and a DRB on an air interface and a QoS parameter corresponding to the DRB; and determining, by the first IAB node, a mapping relationship between the DRB on the air interface and the DRB on the first interface based on the QoS parameter corresponding to the DRB on the first interface and the QoS parameter corresponding to the DRB on the air interface, where the first interface is an interface between the first IAB node and the second IAB node.

Therefore, in this embodiment of this application, the first IAB node may perform distributed bearer mapping management on interface links of the first IAB node. In this way, the first IAB node performs bearer mapping on user plane data.

According to an eighth aspect, a data processing method in an integrated access and backhaul IAB system is provided. The system includes a centralized unit CU, a distributed unit DU, a first IAB node, and a second IAB node, and the method includes:

receiving, by the second IAB node from the CU, a data radio bearer DRB on a first interface and a QoS parameter corresponding to the DRB, and a DRB on a second interface and a QoS parameter corresponding to the DRB; and determining, by the second IAB node, a mapping relationship between the DRB on the first interface and the DRB on the second interface based on the QoS parameter corresponding to the data radio bearer DRB on the first interface and the QoS parameter corresponding to the DRB on the second interface.

The first interface is an interface between the first IAB node and the second IAB node. The second interface is an interface between the second IAB node and the DU.

Therefore, in this embodiment of this application, the second IAB node may perform distributed bearer mapping management on interface links of the second IAB node. In this way, the second IAB node performs bearer mapping on user plane data.

According to a ninth aspect, a data processing method in an integrated access and backhaul IAB system is provided. The system includes a centralized unit CU, a distributed unit DU, a first IAB node, and a second IAB node, and the method includes:

receiving, by the second IAB node from the CU, a DRB on a first interface, a QoS parameter corresponding to the DRB, a service identity of a terminal, and a service QoS parameter corresponding to the service identity; and determining, by the second IAB node, a mapping relationship between a terminal service corresponding to the service identity and the DRB on the first interface based on the QoS parameter corresponding to the DRB on the first interface and the QoS parameter corresponding to the service identity of the terminal.

The first interface is an interface between the first IAB node and the second IAB node.

Therefore, in this embodiment of this application, the second IAB node may perform distributed bearer mapping management on interface links of the second IAB node. In this way, the second IAB node performs bearer mapping on user plane data.

According to a tenth aspect, a data processing method in an integrated access and backhaul IAB system is provided. The system includes a centralized unit CU, a distributed unit DU, a first IAB node, and a second IAB node, and the method includes:

receiving, by the first IAB node from the CU, a DRB on an air interface, a QoS parameter corresponding to the DRB, a service identity of a terminal, and a service QoS parameter corresponding to the service identity; and determining, by the first IAB node, a mapping relationship between a terminal service corresponding to the service identity and the DRB on the air interface based on the QoS parameter corresponding to the DRB on the air interface and the QoS parameter corresponding to the service identity of the terminal.

Therefore, in this embodiment of this application, the first IAB node may perform distributed bearer mapping management on interface links of the first IAB node, so that the first IAB node performs bearer mapping on the user plane data.

According to an eleventh aspect, a data processing method in an integrated access and backhaul IAB system is provided. The system includes a centralized unit CU, a distributed unit DU, a first IAB node, and a second IAB node, and the method includes:

receiving, by the second IAB node from the CU, a mapping relationship between a DRB on a second interface and a QoS parameter corresponding to the DRB, a service identity of a terminal, and a service QoS parameter corresponding to the service identity; and determining, by the second IAB node, a mapping relationship between a terminal service corresponding to the service identity and the DRB on the second interface based on the QoS parameter corresponding to the DRB on the second interface and the QoS parameter corresponding to the service identity of the terminal.

The second interface is an interface between the second IAB node and the DU.

Therefore, in this embodiment of this application, the second IAB node may perform distributed bearer mapping management on interface links of the second IAB node. In this way, the second IAB node performs bearer mapping on user plane data.

According to a twelfth aspect, a data processing method in an integrated access and backhaul IAB system is provided. The system includes a centralized unit CU, a distributed unit DU, a first IAB node, and a second IAB node, and the method includes:

receiving, by the first IAB node from the CU, a DRB on a first interface, a QoS parameter corresponding to the DRB, a service identity of a terminal, and a service QoS parameter corresponding to the service identity; and determining, by the first IAB node, a mapping relationship between a terminal service corresponding to the service identity and the DRB on the first interface based on the QoS parameter corresponding to the DRB on the first interface and the QoS parameter corresponding to the service identity of the terminal.

The first interface is an interface between the first IAB node and the second IAB node.

Therefore, in this embodiment of this application, the first IAB node may perform distributed bearer mapping management on interface links of the first IAB node, so that the first IAB node performs bearer mapping on the user plane data.

According to a thirteenth aspect, an embodiment of this application provides a data processing apparatus, configured to perform the method in any one of the foregoing aspects or any possible implementation of any one of the foregoing aspects. Specifically, the apparatus includes a module configured to perform the method in any one of the foregoing aspects or any possible implementation of any one of the foregoing aspects.

According to a fourteenth aspect, an embodiment of this application provides a data processing apparatus, including a memory and a processor. The memory is configured to store an instruction, the processor is configured to execute the instruction stored in the memory, and when the processor executes the instruction stored in the memory, the execution enables the processor to perform the method in any one of the aspects or any possible implementation of the aspects.

According to a fifteenth aspect, an embodiment of this application provides a computer-readable medium, configured to store a computer program, where the computer program includes an instruction used to perform the method in any one of the aspects or any possible implementation of any one of the aspects.

According to a sixteenth aspect, an embodiment of this application further provides a computer program product including an instruction. When the computer program product runs on a computer, the computer is enabled to perform the method in any one of the aspects or any possible implementation of any one of the aspects.

Based on this, in this embodiment of this application, an IAB donor, the IAB node 1, and the IAB node 2 may perform bearer mapping and processing on control plane signaling based on a message type of a transmitted message or based on a message type of a message included in a transmitted message. Herein, the message type includes a type of an RRC message and a type of an F1AP message.

In this embodiment of this application, a DRB bearer is set up on an interface, for example, a Un interface (such as a Un 1 interface or a Un 2 interface), between IAB nodes, and a Uu interface between an IAB node and UE. In addition, each IAB node may perform bearer mapping on user plane data based on a mapping relationship between DRB bearers on interfaces, or based on a QoS parameter corresponding to a DRB bearer, or based on a QoS parameter to which a UE service flow belongs.

BRIEF DESCRIPTION OF DRAWINGS

FIG. 7A, FIG. 7B, and FIG. 7C show a specific embodiment of bearer mapping performed on a piece of user plane data on each interface according to this application;

DESCRIPTION OF EMBODIMENTS

The following describes technical solutions of this application with reference to the accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5G system, or a new radio (NR) system.

Figure 1:
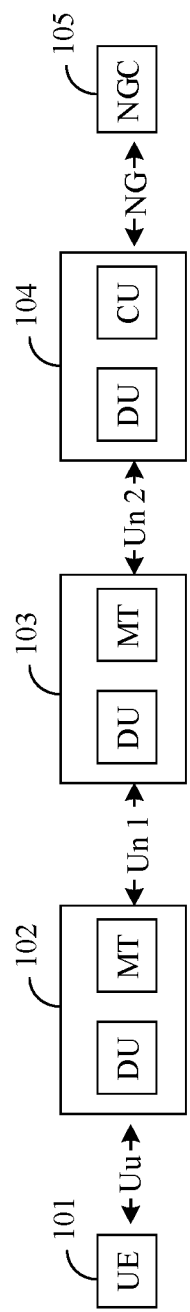
FIG. 1 is a schematic diagram of a system architecture to which an embodiment of this application is applied.

FIG. 1 is a schematic diagram of a system architecture to which an embodiment of this application is applied. As shown in FIG. 1, the system architecture includes UE 101, a relay node 102, a relay node 103, a donor node 104, and a next generation core network (NGC) 105. The donor node 104 is directly connected to the NGC 105. In addition, the donor node 104 is connected to the relay node 103, the relay node 103 is connected to the relay node 102, and the relay node 102 is connected to the UE 101. A physical interface between the UE 101 and the relay node 102 is a Uu interface, and a physical interface between the donor node 104 and the NGC 105 is an NG interface.

It should be understood that names of the physical interface between the relay node 102 and the relay node 103 and the physical interface between the relay node 103 and the donor node are not specifically limited in this embodiment of this application. For example, in this embodiment of this application, the physical interface between the relay node 102 and the relay node 103 and the physical interface between the relay node 103 and the donor node may be referred to as Un interfaces.

It should be further understood that in this embodiment of this application, the donor node 104 may be connected to a plurality of relay nodes, and each relay node may be further connected to another relay node or UE. For example, FIG. 1 shows only one relay node 103 connected to the donor node 104, and also shows only one relay node 102 connected to the relay node 103 and one UE 101 connected to the relay node 102. However, this does not constitute a limitation on this embodiment of this application.

In addition, in this embodiment of this application, the system architecture may be specifically an IAB system architecture. In this case, the relay node may also be referred to as an IAB node, and the donor node may also be referred to as an IAB donor. This is not specifically limited in this embodiment of this application.

The donor node and the relay node in the embodiments of this application may be in a base station form, for example, may be a base transceiver station (BTS) in the GSM system or the CDMA system, may be a NodeB (NB) in the WCDMA, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in a 5G network, a network device in a future evolved PLMN network, or the like. This is not limited in the embodiments of this application.

The UE in the embodiments of this application may be referred to as a terminal device, an access terminal, a subscriber unit, a subscriber station, a mobile station, a mobile station, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the future 5G network, a terminal device in the future evolved public land mobile network (PLMN), or the like. This is not limited in the embodiments of this application.

In this embodiment of this application, the donor node may use an architecture in which a CU is separated from a DU, and the relay node may also use an architecture in which a CU is separated from a DU. A DU entity is located on the relay node, and a CU entity is located on the donor node. The relay node further includes a mobile termination MT entity in addition to the DU entity. Specifically, a CU and a DU in the donor node 104 in FIG. 1 are connected through an F1 interface, and the CU and the NGC 105 are connected through the NG interface. In addition, the DU in the donor node 104 is connected to an MT in the relay node 103 through a Un 2 interface, a DU in the relay node 103 is connected to an MT in the relay node 102 through a Un 1 interface, and a DU in the relay node 102 is connected to the UE 101 through a Uu interface. That is, for the DU in the donor node 104, the MT in the relay node 103 is considered as UE, and for the MT in the relay node 103, the DU in the donor node 104 is considered as a base station. Similarly, for the DU in the relay node 103, the MT in the relay node 102 is considered as UE, and for the MT in the relay node 102, the DU in the relay node 103 is considered as a base station. Similarly, for the UE 101, the DU in the relay node 102 is considered as a base station.

For ease of description, the following uses an example in which the donor node 104 is an IAB donor, the relay node 103 is an IAB node 2, the relay node 104 is an IAB node 1, and the UE 101 is UE for description. However, this constitutes no limitation on this embodiment of this application.

For the UE directly connected to the IAB donor, during uplink transmission (UL), the UE generates a radio resource control (RRC) message and sends the message to the DU on a signaling radio bearer (SRB), for example, an SRB 1, on the Uu interface, and the DU encapsulates a received UE RRC message into an F1AP message of the UE (denoted as UE-associated F1AP), and sends the F1AP message to the CU. During downlink (DL) transmission, the CU encapsulates the generated RRC message into a UE-associated F1AP message and sends the UE-associated F1AP message to the DU. The DU extracts the RRC message of the UE from the UE-associated F1AP message, and then sends the RRC message to the UE on an SRB on the Uu interface.

In the scenario shown in FIG. 1, when the system includes the IAB donor, the IAB node 1, the IAB node 2, and the UE, for the UE, an RRC message of the UE is terminated on the CU of the IAB donor. For the MT entities in the IAB node 1 and the IAB node 2, RRC messages of the MT entities are also terminated on the CU of the IAB donor. In this embodiment of this application, the IAB node 1 and the IAB node 2 may encapsulate respective RRC messages generated by the IAB node 1 and the IAB node 2 into respective F1AP messages of the IAB node 1 and the IAB node 2, or decapsulate respective F1AP messages of the IAB node 1 and the IAB node 2 to extract respective RRC messages of the IAB node 1 and the IAB node 2. In this embodiment of this application, an RRC message of the IAB node 1 and an F1AP message of the UE attached to the IAB node 1 may both be transmitted on an interface between the IAB node 1 and the IAB node 2. An RRC message of the IAB node 2, an F1AP message of the IAB node 1 attached to the IAB node 2, and an F1AP message of the UE attached to IAB node 1 may all be transmitted on an interface between the IAB node 2 and the DU of the IAB donor. An F1AP message of the IAB 2, an F1AP message of the IAB node 1 attached to the IAB node 2, and an F1AP message of the UE attached to the IAB node 1 may all be transmitted on an interface between the DU and the CU of the IAB donor. Based on this, in this embodiment of this application, an IAB donor, the IAB node 1, and the IAB node 2 may perform bearer mapping and processing on control plane signaling based on a message type of a transmitted message or based on a message type of a message included in a transmitted message. Herein, the message type includes an RRC message and an F1AP message.

With reference to specific embodiments, the following describes in detail methods of bearer mapping and processing that are performed on control plane signaling on different interfaces in the embodiments of this application. It should be noted that the following is merely intended to help a person skilled in the art understand and implement the embodiments of this application, but is not intended to limit the scope of the embodiments of this application. A person skilled in the art may perform equivalent transformation or modification based on the example provided herein, and such transformation or modification should still fall within the scope of the embodiments of this application.

Figure 2:
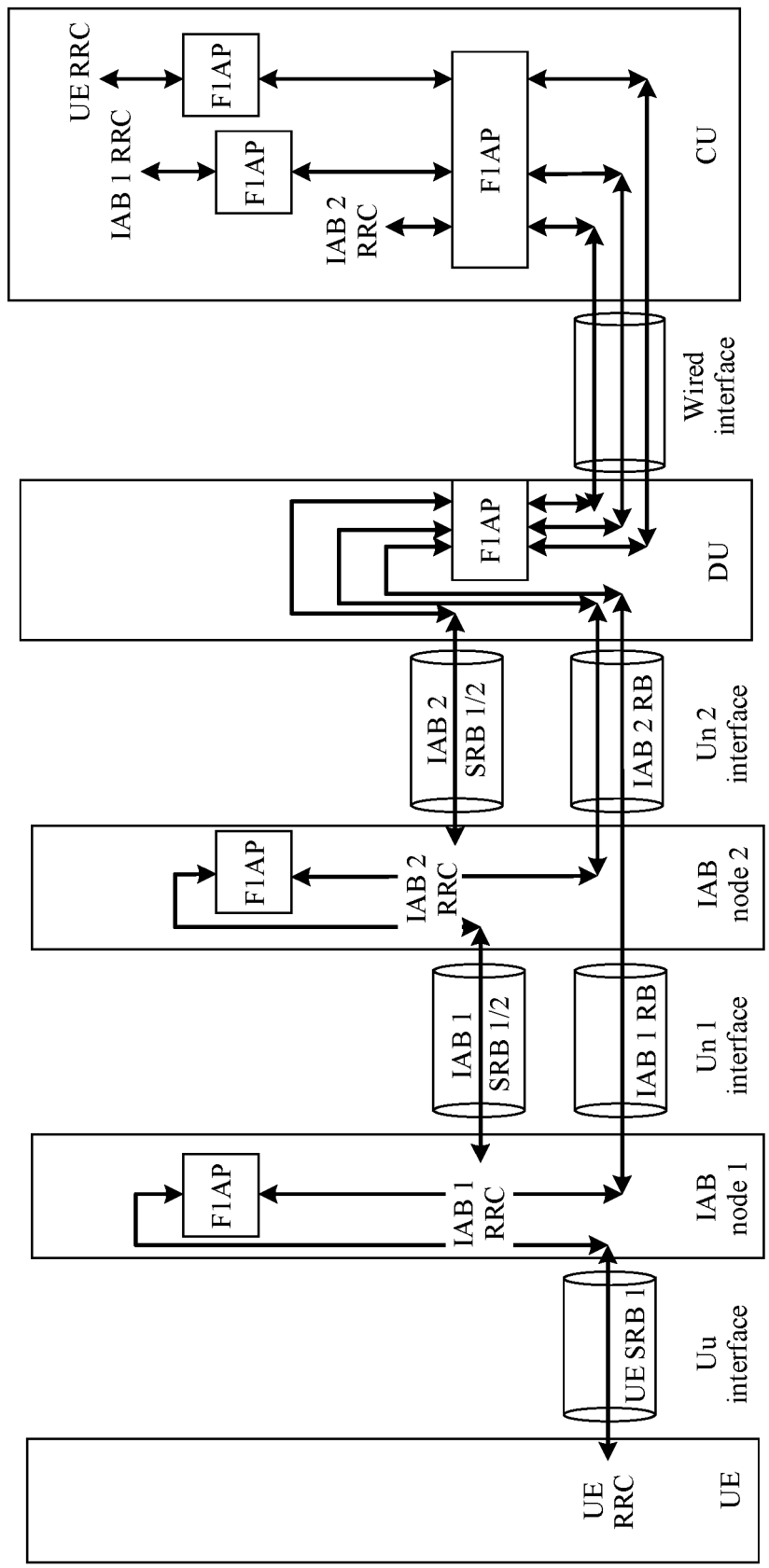
FIG. 2 shows a specific embodiment of bearer mapping and processing that are performed on a piece of control plane signaling on each interface according to this application.

FIG. 2 shows a specific embodiment of bearer mapping and processing that are performed on control plane signaling on each interface according to this application. Herein, a CU and a DU are located in an IAB donor. Specifically, for the CU, the DU, an IAB node 2, an IAB node 1, and UE, refer to the foregoing descriptions. Details are not described herein again.

Specifically, an SRB 1 of the UE (denoted as a UE SRB 1) is set up on a Uu interface between the UE and the IAB node 1, and an RRC message of the UE (denoted as UE RRC) may be carried on the UE SRB 1 for transmission. Alternatively, an SRB 2 of the UE (denoted as a UE SRB 2) is set up on a Uu interface between the UE and the IAB node 1, and an RRC message of the UE (denoted as UE RRC) may be carried on the UE SRB 2 for transmission.

An SRB 1 of the IAB node 1 (denoted as an IAB 1 SRB 1) is set up on a Un 1 interface between the IAB node 1 and the IAB node 2, and an RRC message of the IAB node 1 (denoted as IAB 1 RRC) may be carried on the IAB 1 SRB 1 for transmission. Alternatively, an SRB 2 of the IAB node 1 (denoted as an IAB 1 SRB 2) is set up on a Un 1 interface between the IAB node 1 and the IAB node 2, and an RRC message of the IAB node 1 (denoted as IAB 1 RRC) may be carried on the IAB 1 SRB 2 for transmission.

In an optional embodiment, a dedicated RB of the IAB 1 (denoted as an IAB 1 RB) may be further set up on the Un 1 interface between the IAB node 1 and the IAB node 2. In an example, the dedicated RB may be a newly defined SRB. The dedicated RB is different from an existing SRB 0/1/2 in the prior art, and is only used to transmit an F1AP message. Alternatively, the dedicated RB may be a data radio bearer (DRB). In this embodiment of this application, after receiving the UE RRC on the UE SRB 1, the IAB node 1 encapsulates the UE RRC to generate an F1AP message of the UE (denoted as a UE-associated F1AP message). In an example, the UE-associated F1AP message may be carried on the IAB 1 RB for transmission.

An SRB 1 of the IAB 2 (denoted as an IAB 2 SRB 1) is set up on a Un 2 interface between the IAB node 2 and the DU, and an RRC message of the IAB 2 (denoted as IAB 2 RRC) may be carried on the IAB 2 SRB 1 for transmission. Alternatively, an SRB 2 of the IAB 2 (denoted as an IAB 2 SRB 2) is set up on a Un 2 interface between the IAB node 2 and the DU, and an RRC message of the IAB 2 (denoted as IAB 2 RRC) may be carried on the IAB 2 SRB 2 for transmission.

In an optional embodiment, a dedicated RB of the IAB 2 (denoted as an IAB 2 RB) may be further set up on the Un 2 interface between the IAB node 2 and the DU. In an example, the dedicated RB may be a newly defined SRB. The dedicated RB may be different from the existing SRB 0/1/2, and is only used to transmit an F1AP message. Alternatively, the dedicated RB may be a DRB. In an example, after receiving the UE-associated F1AP message on the IAB 1 RB, the IAB node 2 may transmit the UE-associated F1AP message on the IAB 2 RB.

In this embodiment of this application, after receiving the IAB 1 RRC on the IAB 1 SRB 1, the IAB node 2 encapsulates the IAB 1 RRC message to generate an F1AP message of the IAB 1 (denoted as an IAB 1-associated F1AP message). In an example, the IAB 1-associated F1AP message may be carried on the IAB 2 RB for transmission.

The DU is connected to the CU through a wired interface. The wired interface between the DU and the CU may carry an F1AP message of the IAB 2 (denoted as an IAB 2-associated F1AP message).

Optionally, after receiving the IAB 2 RRC on the IAB 2 SRB 1, the DU encapsulates the IAB 2 RRC message to generate an F1AP message of the IAB 2 (denoted as an IAB 2-associated F1AP message). The IAB 2-associated F1AP message is sent to the CU in a wired manner. In addition, the IAB 2 may alternatively encapsulate the IAB 1-associated F1AP message and/or the UE-associated F1AP message into the IAB 2-associated F1AP message for transmission.

In general, in this embodiment of this application, bearer mapping of the UE RRC on each interface is as follows:

On the Uu interface, the UE RRC is mapped onto the SRB 1 or the SRB 2 for transmission. On the Un 1 interface, the UE RRC is encapsulated into the UE-associated F1AP message and then the UE-associated F1AP message is mapped onto the dedicated RB for transmission. The dedicated RB may be the DRB or the newly defined SRB. On the Un 2 interface, the UE-associated F1AP message is mapped onto the dedicated RB for transmission, which is consistent with the dedicated RB on the Un 1 interface. On an F1 interface, the UE-associated F1AP message is further encapsulated into the IAB 2-associated F1AP message for transmission.

In this embodiment of this application, the IAB node 2 first needs to access a network and then the IAB node 1 accesses the network before the UE accesses the network.

Specifically, in a process of accessing the network, the IAB node 2 sets up, on the Un 2 interface, the IAB 2 SRB 1 used to transmit an IAB 2 RRC message.

In addition, optionally, when setting up the IAB 2 SRB 1, the IAB node 2 may further set up, on the Un 2 interface, the IAB 2 RB specially used to transmit an F1AP message. In an example, after both the IAB node 1 and the UE access the network, the IAB 2 RB may be used to transmit an UE-associated F1AP message and/or an IAB 1-associated F1AP message. For a UL, similar to a case of the IAB 2 SRB 1, when the DU receives signaling on the IAB 2 RB, the DU encapsulates the signaling into an IAB 2-associated F1AP message and sends the IAB 2-associated F1AP message to the CU. For a DL, the DU receives signaling from an IAB 2-associated F1AP message, and learns of a type of the signaling carried in the IAB 2-associated F1AP message based on signaling type indication information sent by the CU. If the signaling is an RRC message, the RRC message is mapped onto the IAB 2 SRB 1 and sent to the IAB node 2. If the signaling is an F1AP message, the message is mapped onto the IAB 2 RB and sent to the IAB node 2. In a process of accessing the network, the IAB node 1 sets up, on the Un 1 interface, the IAB 1 SRB 1 for transmitting the IAB 1 RRC message.

Optionally, when setting up the IAB 1 SRB 1, the IAB node 1 may set up, on the Un 1 interface, the IAB 1 RB specially used to transmit the F1AP message. In an example, after the UE accesses the network, the IAB 1 RB may be used to transmit the UE-associated F1AP message. For a UL, as long as the IAB node 2 receives signaling on the IAB 1 RB, the IAB node 2 maps the signaling onto the IAB 2 RB and sends the signaling to the DU. For a DL, when the IAB node 2 receives signaling on the IAB 2 RB and the signaling needs to be routed to a next-hop node, the IAB node 2 maps the signaling onto the IAB 1 RB and sends the signaling to the IAB node 1.

Figure 3:
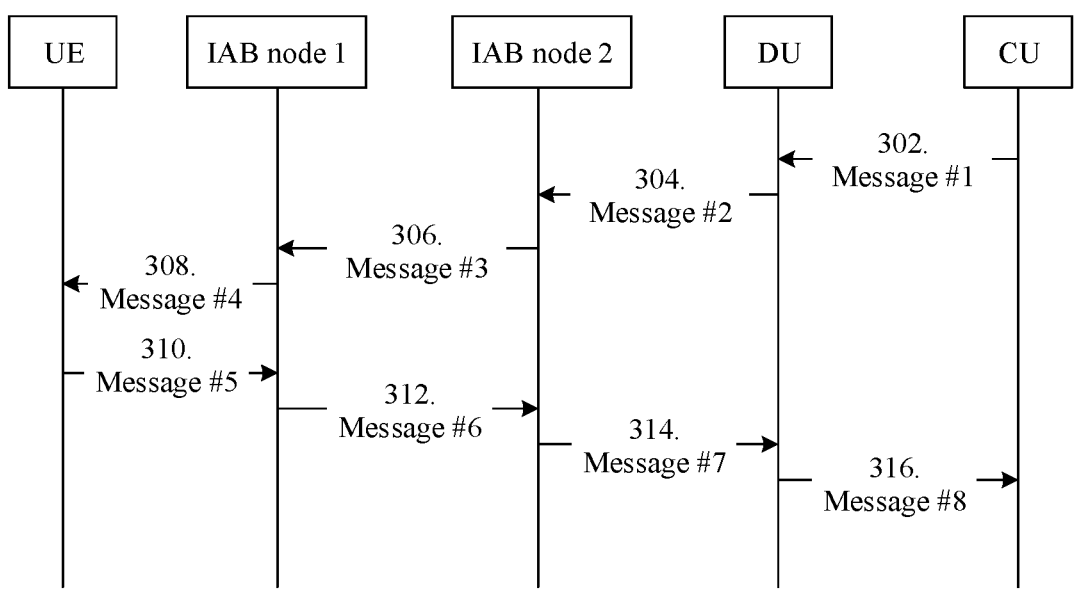
FIG. 3 is a schematic flowchart of a data transmission method according to an embodiment of this application.

FIG. 3 is a schematic flowchart of a data transmission method according to an embodiment of this application. 302 to 308 are a data transmission procedure in a DL direction, and 310 to 316 are a data transmission procedure in a UL direction.

With reference to 302 to 308 in FIG. 3, the following specifically describes a data processing method in this embodiment of this application on a downlink. In a possible implementation, 302 to 308 may be applied to the system shown in FIG. 2. In this case, 302 to 308 in FIG. 3 may be denoted as 302' to 308' respectively, that is, a CU, a DU, an IAB node 2, an IAB node 1, and UE in 302' to 308' below may be corresponding network elements in FIG. 2.

302'. The CU sends a message #1 to the DU.

In an optional embodiment, herein, the CU may send an IAB 2-associated F1AP message (that is, the message #1) to the DU through a wired interface, where the IAB 2-associated F1AP message may carry at least one of an IAB 2 RRC message, an IAB 1-associated F1AP message, or a UE-associated F1AP message. Specifically, the following several possibilities may exist: The IAB 2-associated F1AP message includes an IAB 2 RRC message. Alternatively, the IAB 2-associated F1AP message includes an IAB 1-associated F1AP message. Alternatively, the IAB 2-associated F1AP message includes a UE-associated F1AP message. Alternatively, the IAB 2-associated F1AP message includes an IAB 2 RRC message and an IAB 1-associated F1AP message. Alternatively, the IAB 2-associated F1AP message includes an IAB 2 RRC message and a UE-associated F1AP message. Alternatively, the IAB 2-associated F1AP message includes an IAB 1-associated F1AP message and a UE-associated F1AP message. Alternatively, the IAB 2-associated F1AP message includes an IAB 2 RRC message, an IAB 1-associated F1AP message, and a UE-associated F1AP message.

In this case, the CU further sends a piece of type indication information to the DU, to indicate a message type of a message carried in the IAB 2-associated F1AP message. The message type may be an RRC message type, or may be an F1AP message type. The DU performs, based on the type indication information, different processing on different messages carried in the IAB 2-associated F1AP.

Specifically, the CU may encapsulate a UE RRC message to generate a UE-associated F1AP message, encapsulate the UE-associated F1AP message into an IAB 2-associated F1AP message, and send the IAB 2-associated F1AP message to the DU. The CU may alternatively encapsulate an IAB 1 RRC message to generate an IAB 1-associated F1AP message, encapsulate the IAB 1-associated F1AP message into an IAB 2-associated F1AP message, and send the IAB 2-associated F1AP message to the DU. The CU may alternatively encapsulate an IAB 2 RRC message to generate an IAB 2-associated F1AP message, and then send the IAB 2-associated F1AP message to the DU.

Optionally, in this embodiment of this application, the CU may send an IAB 2-associated F1AP message including the type indication information to the DU, or the CU may send the type indication information, to the DU, on an adaptation layer above a peer F1AP layer between the CU and the IAB node 2. This is not specifically limited in this embodiment of this application.

It should be understood that, in this embodiment of this application, the IAB 2-associated F1AP message may carry at least one of an IAB 2 RRC message, an IAB 1-associated F1AP message, or a UE-associated F1AP message. In this case, each message carried in the IAB 2-associated F1AP message may correspond to one piece of type indication information, to indicate a message type of a message corresponding to the type indication information.

Optionally, the CU may further send indication information to the DU, and the DU further forwards the indication information to the IAB node 2 and the IAB node 1, to indicate whether the IAB node 2 and the IAB node 1 need to process a received F1AP message. In an example, the indication information may be node identification information, for example, a node identifier of the IAB node 1 or an identifier of the UE. In some possible implementations, the CU may send an IAB 2-associated F1AP message including the indication information to the DU, or the CU may send, to the DU, the indication information on an adaptation layer above a peer F1AP layer between the CU and the IAB 2. This is not specifically limited in this embodiment of this application.

304'. The DU sends a message #2 to the IAB node 2.

In an optional embodiment, when the DU obtains the IAB 2-associated F1AP message and the type indication information from the CU through the wired interface, if the type indication information indicates that the IAB 2-associated F1AP message carries the RRC message, the DU maps the RRC message extracted from the IAB 2-associated F1AP message onto the IAB 2 SRB 1 and sends the RRC message to the IAB node 2. In this case, the IAB 2 RRC message is the message #2.

In another optional embodiment, when the DU obtains the IAB 2-associated F1AP message and the type indication information from the CU through the wired interface, if the type indication information indicates that the IAB 2-associated F1AP message carries the F1AP message, the DU maps the F1AP message extracted from the IAB 2-associated F1AP message onto the IAB 2 RB and sends the F1AP message to the IAB node 2. In this case, the F1AP message is the message #2.

Optionally, the DU may further send indication information to the IAB node 2, where the indication information is used to indicate whether the IAB node 2 needs to process the F1AP message extracted from the IAB 2-associated F1AP message. In an example, the indication information may be node identification information, for example, a node identifier of the IAB node 1 or an identifier of the UE. In some possible implementations, the indication information may be carried in an RLC (Radio Link Control) layer header field of the Un 2 interface, or on an adaptation layer of the Un 2 interface.

Therefore, in this embodiment of this application, the CU sends, to the DU, indication information used to indicate a type of a message included in the IAB 2-associated F1AP message, so that the DU can map decapsulated data packets onto different bearers based on types of different messages included in the IAB 2-associated F1AP message. In this way, the DU performs bearer mapping on control plane signaling.

306'. The IAB node 2 sends a message #3 to the IAB node 1.

In an optional embodiment, when receiving a data packet on the IAB 2 SRB 1 on the Un 2 interface, the IAB node 2 may determine that the data packet is an IAB 2 RRC message. In this case, the IAB node 2 may directly send the data packet to an RRC layer for processing.

In an optional embodiment, when receiving a data packet on the IAB 2 RB on the Un 2 interface, the IAB node 2 may determine that the data packet is an F1AP message.

In this case, in an optional embodiment, the IAB node 2 may determine, with reference to routing information of the F1AP message, whether the F1AP message needs to be processed by the IAB node 2. Specifically, when the routing information of the F1AP message indicates that a target routing node of the F1AP message is the IAB node 1, it indicates that the F1AP message needs to be processed by the IAB node 2. In this case, the IAB node 2 decapsulates the F1AP message. When learning that an RRC message carried in the F1AP message is an IAB 1 RRC message, the IAB node 2 maps the IAB 1 RRC message onto the IAB 1 SRB 1 on the Un 1 interface and sends the IAB 1 RRC message to the IAB node 1. In this case, the IAB 1 RRC message is the message #3.

When the routing information of the F1AP message indicates that the target routing node of the F1AP message is not a next-hop node connected to the IAB node 2, for example, when the target routing node is the UE, it indicates that the F1AP message does not need to be processed by the IAB node 2. In this case, the IAB node 2 determines that the next-hop node is the IAB node 1 based on the routing information, maps the F1AP message onto the IAB 1 RB on the Un 1 interface, and sends the F1AP message to the IAB node 1. In this case, the F1AP message is the message #3.

In another optional embodiment, the IAB node 2 may further determine, with reference to the indication information sent by the DU to the IAB node 2, whether the F1AP message transmitted on the IAB 2 RB needs to be processed by the IAB node 2. In an example, the indication information may be node identification information, for example, a node identifier of the IAB node 1 or an identifier of the UE. Specifically, when determining, based on the indication information, that the IAB node 2 needs to process the F1AP message, the IAB node 2 decapsulates the F1AP message. When learning that an RRC message carried in the F1AP message is an IAB 1 RRC message, the IAB node 2 maps the IAB 1 RRC message onto the IAB 1 SRB 1 on the Un 1 interface and sends the IAB 1 RRC message to the IAB node 1. In this case, the IAB 1 RRC message is the message #3.

When the IAB node 2 determines, based on the indication information, that the F1AP message does not need to be processed by the IAB node 2, the IAB node 2 determines, based on the routing information, that a next-hop node is the IAB node 1. In addition, the IAB node 2 maps the F1AP message onto the IAB 1 RB on the Un 1 interface and sends the F1AP message to the IAB node 1. In this case, the F1AP message is the message #3.

308'. The IAB node 1 sends a message #4 to the UE.

In an optional embodiment, when receiving a message on the IAB 1 SRB 1 on the Un 1 interface, the IAB node 1 may determine that the message is an IAB 1 RRC message. In this case, the IAB node 1 may directly send the message to an RRC layer for processing.

In an optional embodiment, when receiving a message on the IAB 1 RB on the Un 1 interface, the IAB node 1 may determine that the message is an F1AP message. Specifically, the IAB node 1 decapsulates the F1AP message. When learning that an RRC message carried in the F1AP message is a UE RRC message, the IAB node maps the UE RRC message onto the UE SRB 1 on the Uu interface, and sends the UE RRC message to the UE. In this case, the UE RRC message is the message #4.

In this embodiment of this application, the IAB 1 RB on the Un 1 interface and the IAB 2 RB on the Un 2 interface may be SRBs (different from existing SRBs 0/1/2), or may be DRBs, and are used to transmit only an F1AP message.

Therefore, in this embodiment of this application, the RRC message is transmitted on the SRB 1, and the F1AP message is transmitted on the dedicated RB, so that the IAB 2 and the IAB 1 can determine a message type of an obtained message and can perform bearer mapping on control plane signaling based on different message types. Optionally, alternatively, the RRC message may be transmitted on the SRB 2, and the F1AP message may be transmitted on the dedicated RB, so that the IAB 2 and the IAB 1 can determine a message type of an obtained message and can perform bearer mapping on control plane signaling based on different message types. This is not specifically limited in this embodiment of this application.

With reference to 310 to 316 in FIG. 3, the following specifically describes a data processing method in this embodiment of this application on an uplink (UL). In a possible implementation, 310 to 316 may be applied to a system shown in FIG. 2. In this case, 310 to 316 in FIG. 3 may be denoted as 310' to 316' respectively, that is, a CU, a DU, an IAB node 2, an IAB node 1, and UE in 310' to 316' below may be corresponding network elements in FIG. 4.

310'. The UE sends a message #5 to the IAB node 1.

Specifically, the UE generates a UE RRC message, and sends the UE RRC message to the IAB node 1 on a UE SRB 1 on a Uu interface. In this case, the UE RRC message is the message #5.

312'. The IAB node 1 sends a message #6 to the IAB node 2.

In an optional embodiment, when receiving the UE RRC message on the UE SRB 1 on the Uu interface, the IAB node 1 encapsulates the UE RRC message to generate a UE-associated F1AP message and sends the UE-associated F1AP message to the IAB node 2 on the IAB 1 RB on the Un 1 interface. In this case, the UE-associated F1AP is the message #6.

In an optional embodiment, the IAB node 1 may alternatively generate an IAB 1 RRC message and send the IAB 1 RRC message to the IAB node 2 on an IAB 1 SRB 1 on a Un 1 interface. In this case, the IAB 1 RRC message is a message #6.

314'. The IAB node 2 sends a message #7 to the DU.

In an optional embodiment, the IAB node 2 may receive the UE-associated F1AP message on the IAB 1 RB on the Un 1 interface, map the UE-associated F1AP onto an IAB 2 RB on a Un 2 interface, and send the UE-associated F1AP to the DU. In this case, the UE-associated F1AP message is the message #7.

In an optional embodiment, the IAB node 2 may alternatively receive the IAB 1 RRC message on the IAB 1 SRB 1 on the Un 1 interface, and encapsulate the IAB 1 RRC message to generate an IAB 1-associated F1AP message. Then, the IAB node 2 maps the IAB 1-associated F1AP message onto an IAB 2 RB on a Un 2 interface and sends the IAB 1-associated F1AP message to the DU. In this case, the IAB 1-associated F1AP is the message #7.

In an optional embodiment, the IAB node 2 may alternatively generate an IAB 2 RRC message, map the IAB 2 RRC message onto an IAB 2 SRB 1 on a Un 2 interface, and send the IAB 2 RRC message to the DU. In this case, the IAB 2 RRC message is the message #7.

316'. The DU sends a message #8 to the CU.

In an optional embodiment, the DU encapsulates at least one of the IAB 2 RRC message received on the IAB 2 SRB 1, the IAB 1-associated F1AP message received on the IAB 2 RB, or the UE-associated F1AP message received on the IAB 2 RB, generates an IAB 2-associated F1AP message, and sends the IAB 2-associated F1AP message to the CU through a wired interface. In this case, the IAB 2-associated F1AP is the message #8.

In this case, the DU further needs to send a type indication message to the CU, to indicate a message type of a message carried in the IAB 2-associated F1AP message. The message type may be an RRC message and/or an F1AP message, so that the CU performs, based on the type indication information, different processing on different messages carried in the IAB 2-associated F1AP message.

Specifically, the CU decapsulates the IAB 2-associated F1AP message to extract the RRC message and/or the F1AP message from the IAB 2-associated F1AP message. Specifically, when the type indication information indicates that the message carried in the IAB 2-associated F1AP message is the RRC message, the CU sends the RRC message to a peer RRC layer between the CU and the IAB node 2 for processing.

When the type indication information indicates that the message carried in the IAB 2-associated F1AP message is the F1AP message, the CU determines, with reference to IP address information carried on an IP layer or a node identifier, that the F1AP message is a UE-associated F1AP message, or an IAB 1-associated F1AP message. When the CU determines that the F1AP message is the UE-associated F1AP message, the CU sends the UE-associated F1AP message to a peer F1AP layer between the CU and the UE for processing. Further, the CU decapsulates the UE-associated F1AP message on the peer F1AP layer between the CU and the UE, to obtain a UE RRC message. When the CU determines that the F1AP message is the IAB 1-associated F1AP message, the CU sends the IAB 1-associated F1AP message to a peer F1AP layer between the CU and the IAB 1 for processing. Further, the CU decapsulates the IAB 1-associated F1AP on the peer F1AP layer between the CU and the IAB 1, to obtain an IAB 1 RRC message.

Optionally, the DU may send the node identifier to the CU. In some possible implementations, the node identifier may be carried in an IAB 2-associated F1AP message, or carried on an adaptation layer above a peer F1AP layer between the CU and the IAB node 2.

In this embodiment of this application, the IAB 1 RB on the Un 1 interface and the IAB 2 RB on the Un 2 interface may be SRBs (different from existing SRBs 0/1/2), or may be DRBs, and are used to transmit only an F1AP message.

Therefore, in this embodiment of this application, the RRC message is transmitted on the SRB 1, and the F1AP message is transmitted on the dedicated RB, so that the IAB 2, the IAB 1, and the DU can determine a message type of an obtained message and can perform bearer mapping on control plane signaling based on different message types. In addition, the DU sends a type of a message included in an IAB 2-associated F1AP message to the CU, so that the CU can send decapsulated messages to different processing layers based on types of different messages included in the IAB 2-associated F1AP message, thereby implementing bearer mapping of control plane signaling.

Optionally, alternatively, the RRC message may be transmitted on the SRB 2, and the F1AP message may be transmitted on the dedicated RB, so that the IAB 2, the IAB 1, and the DU can determine a message type of an obtained message and can perform bearer mapping on control plane signaling based on different message types. In addition, the DU sends a type of a message included in an IAB 2-associated F1AP message to the CU, so that the CU can send decapsulated messages to different processing layers based on types of different messages included in the IAB 2-associated F1AP message, thereby implementing bearer mapping of control plane signaling. This is not specifically limited in this embodiment of this application.

In general, in this embodiment of this application, in a downlink direction, the DU separately maps, based on the type indication information sent by the CU, the IAB 2 RRC onto the IAB 2 SRB 1 or the IAB 2 SRB 2 for transmission, and the UE-associated F1AP message and/or the IAB 1-associated F1AP message onto the IAB 2 RB for transmission. The IAB node 2 extracts the F1AP message from the IAB 2 RB, and further learns, based on the routing information or the node indication information sent by the DU, whether the F1AP message transmitted on the dedicated RB needs to be processed by the IAB node 2. In an uplink direction, the CU learns, based on type indication information sent by the DU, that the IAB 2-associated F1AP message carries an RRC message and/or an F1AP message, and learns, based on node indication information sent by the DU or an IP address on an IP layer, whether the F1AP message is sent to a peer F1AP layer between the CU and the UE for processing or to a peer F1AP layer between CU and the IAB node 1 for processing.

Figure 4:
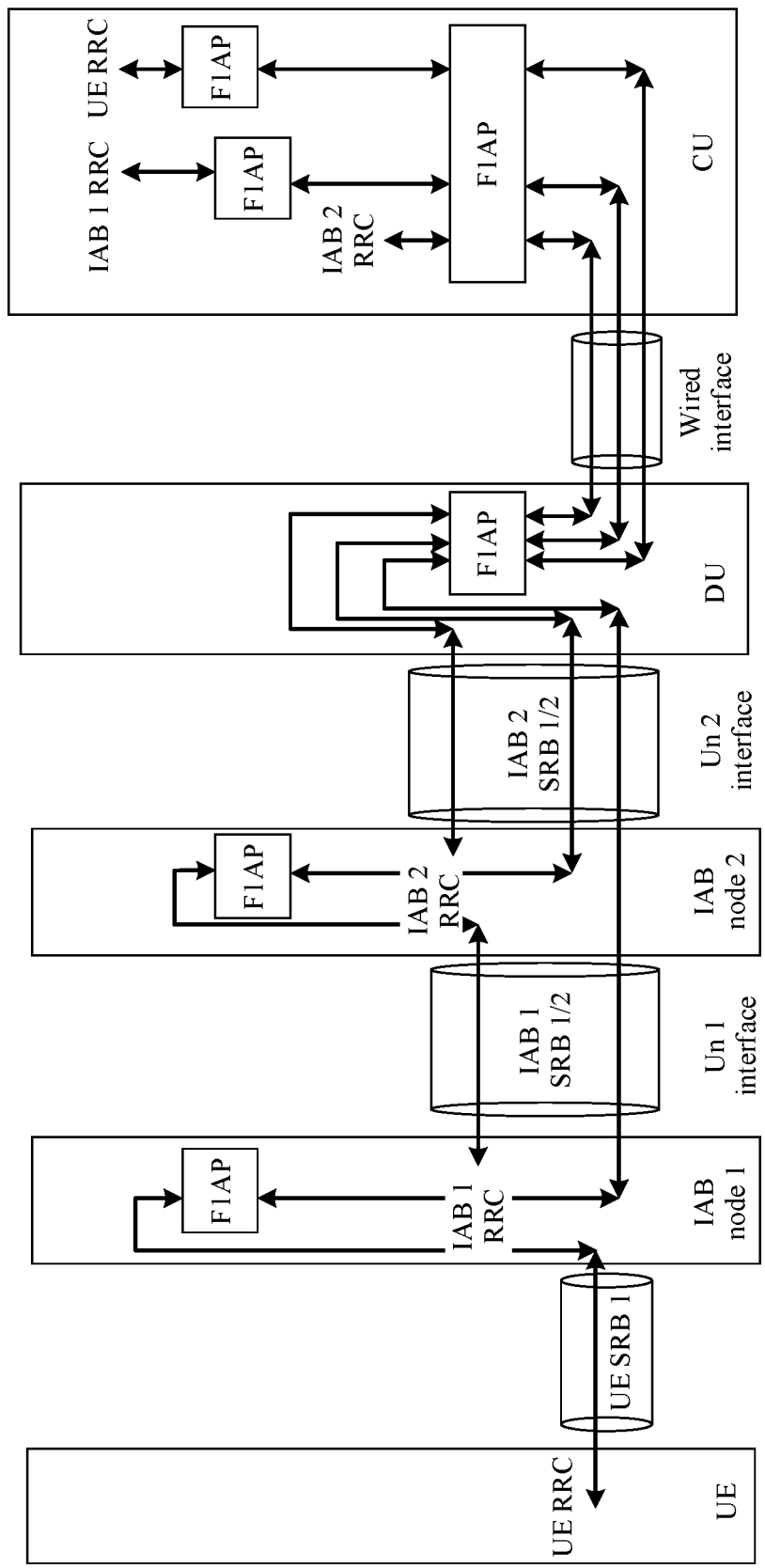
FIG. 4 shows a specific embodiment of bearer mapping and processing that are performed on another piece of control plane signaling on each interface according to this application.

FIG. 4 shows a specific embodiment of bearer mapping and processing that are performed on another piece of control plane signaling on each interface according to this application. Herein, a CU and a DU are located in an IAB donor. Specifically, for the CU, the DU, an IAB node 2, an IAB node 1, and UE, refer to the foregoing descriptions. Details are not described herein again.

Specifically, an SRB 1 of the UE (denoted as a UE SRB 1) is set up on a Uu interface between the UE and the IAB node 1, and an RRC message of the UE (denoted as UE RRC) may be carried on the UE SRB 1 for transmission.

An SRB 1 of the IAB node 1 (denoted as an IAB 1 SRB 1) is set up on a Un 1 interface between the IAB node 1 and the IAB node 2, and an RRC message of the IAB 1 (denoted as IAB 1 RRC) may be carried on the IAB 1 SRB 1 for transmission.

In this embodiment of this application, the IAB node 1 may encapsulate the UE RRC to generate an F1AP message of the UE (denoted as a UE-associated F1AP message). In an optional embodiment, the UE-associated F1AP message may be carried on the IAB 1 SRB 1 for transmission.

An SRB 1 of the IAB node 2 (denoted as an IAB 2 SRB 1) is set up on a Un 2 interface between the IAB node 2 and the DU, and an RRC message of the IAB node 2 (denoted as IAB 2 RRC) may be carried on the IAB 2 SRB 1 for transmission.

In an optional embodiment, after receiving the UE-associated F1AP message on the IAB 1 SRB 1, the IAB node 2 maps the UE-associated F1AP message onto the IAB 2 SRB 1 for transmission.

In this embodiment of this application, the IAB node 2 may encapsulate the IAB 1 RRC message to generate an F1AP message of the IAB node 1 (denoted as an IAB 1-associated F1AP message). In an optional embodiment, the IAB 1-associated F1AP message is mapped onto the IAB 2 SRB 1 for transmission.

The DU is connected to the CU through a wired interface. Specifically, the wired interface between the DU and the CU may carry an F1AP message of the IAB node 2 (denoted as an IAB 2-associated F1AP message).

Optionally, the DU may encapsulate at least one of an RRC message of the IAB node 2 (denoted as IAB 2 RRC), an IAB 1-associated F1AP message, or a UE-associated F1AP message into an IAB 2-associated F1AP message for transmission.

Therefore, in this embodiment of this application, an existing IAB 1 SRB 1 may be reused on the Un 1 interface between the IAB node 1 and the IAB node 2 to transmit an F1AP message, and an existing IAB 2 SRB 1 may be reused on the Un 2 interface between the IAB node 2 and the DU to transmit an F1AP message, without a need to set up a new dedicated radio bearer between the IAB node 1 and the IAB node 2 and a new dedicated radio bearer between the IAB node 2 and the DU.

In general, in this embodiment of this application, bearer mapping of the UE RRC on each interface is as follows:

On the Uu interface, the UE RRC is mapped onto the SRB 1 or the SRB 2 for transmission. On the Un 1 interface, the UE RRC is encapsulated into a UE-associated F1AP message and then the UE-associated F1AP message is mapped onto the SRB 1 or the SRB 2 for transmission. On the Un 2 interface, the UE-associated F1AP message is mapped onto the SRB 1 or the SRB 2 for transmission. On an F1 interface, the UE-associated F1AP message is further encapsulated into the IAB 2-associated F1AP message for transmission.

With reference to 302 to 308 in FIG. 3, the following specifically describes a data processing method in this embodiment of this application on a downlink (DL). In another possible implementation, 302 to 308 may be applied to a system shown in FIG. 4. In this case, 302 to 308 in FIG. 3 may be denoted as 302" to 308" respectively, that is, a CU, a DU, an IAB node 2, an IAB node 1, and UE in 302" to 308" below may be corresponding network elements in FIG. 4.

302". The CU sends a message #1 to the DU.

Specifically, for 302", refer to the foregoing description in 302'. To avoid repetition, details are not described herein again.

304". The DU sends a message #2 to the IAB node 2.

In an optional embodiment, when the DU obtains the IAB 2-associated F1AP message and type indication information from the CU through the wired interface, the DU may decapsulate the IAB 2-associated F1AP message to extract an IAB 2 RRC message and/or an F1AP message included therein, maps the extracted IAB 2 RRC message and/or F1AP message onto the IAB 2 SRB 1, and sends the extracted IAB 2 RRC message and/or F1AP message to the IAB node 2. In this case, the IAB 2 RRC message and/or the F1AP message are/is the message #2.

In addition, the DU needs to forward the type indication message to the IAB node 2. Specifically, the type indication information may be carried in an RLC header field of the Un 2 interface, or on an adaptation layer of the Un 2 interface.

Optionally, the DU may further send indication information to the IAB node 2, where the indication information is used to indicate whether the IAB node 2 needs to process the F1AP message extracted from the IAB 2-associated F1AP message. In an example, the indication information may be node identification information, for example, a node identifier of the IAB node 1 or an identifier of the UE. In some possible implementations, the indication information may be carried in an RLC header field of the Un 2 interface, or on an adaptation layer of the Un 2 interface.

306". The IAB node 2 sends a message #3 to the IAB node 1.

In an optional embodiment, when the IAB node 2 receives a message on the IAB 2 SRB 1 on the Un 2 interface and receives type indication information, the IAB node 2 may determine, based on the type indication information, a message type of the message received on the IAB 2 SRB 1. The message type may be an RRC message or an F1AP message.

Specifically, when determining that the message is an IAB 2 RRC message, the IAB node 2 may directly send the message to an RRC layer for processing.

When the IAB node 2 determines that the message is an F1AP message, in an optional embodiment, the IAB node 2 may determine, with reference to routing information of the F1AP message, whether the F1AP message needs to be processed by the IAB node 2. Specifically, when the routing information of the F1AP message indicates that a target routing node of the F1AP message is the IAB node 1, it indicates that the F1AP message needs to be processed by the IAB node 2. In this case, the IAB node 2 decapsulates the F1AP message. When learning that an RRC message carried in the F1AP message is an IAB 1 RRC message, the IAB node 2 maps the IAB 1 RRC message onto the IAB 1 SRB 1 on the Un 1 interface and sends the IAB 1 RRC message to the IAB node 1. In this case, the IAB 1 RRC message is the message #3.

When the routing information of the F1AP message indicates that the target routing node of the F1AP message is not a next-hop node connected to the IAB node 2, for example, when the target routing node is the UE, it indicates that the F1AP message does not need to be processed by the IAB node 2. In this case, the IAB node 2 maps the F1AP message onto the IAB 1 SRB 1 on the Un 1 interface, and sends the F1AP message to the IAB node 1. In this case, the F1AP message is the message #3.

In another optional embodiment, the IAB node 2 may determine, with reference to the indication information sent by the DU to the IAB node 2, whether the F1AP message on the IAB 2 RB needs to be processed by the IAB node 2. Specifically, when determining, based on the indication information, that the IAB node 2 needs to process the F1AP message, the IAB node 2 decapsulates the F1AP message. When learning that an RRC message carried in the F1AP message is an IAB 1 RRC message, the IAB node 2 maps the IAB 1 RRC message onto the IAB 1 SRB 1 on the Un 1 interface and sends the IAB 1 RRC message to the IAB node 1. In this case, the IAB 1 RRC message is the message #3.

When determining, based on the indication information, that the IAB node 2 does not need to process the F1AP message, the IAB node 2 maps the F1AP message onto the IAB 1 SRB 1 on the Un 1 interface, and sends the F1AP message to the IAB node 1. In this case, the F1AP message is the message #3.

Optionally, in this embodiment of this application, the IAB node 2 may further send a piece of type indication information to the IAB node 1 through the Un 1 interface, to indicate a message type of a message transmitted on the IAB 1 SRB 1, so that the IAB node 1 can perform different processing on different messages received on the IAB 1 SRB 1.

Therefore, in this embodiment of this application, the CU sends the IAB 2-associated F1AP message and the type indication information to the DU, and the DU decapsulates the IAB 2-associated F1AP message and forwards the type indication message to the IAB node 2. In this way, the IAB node 2 can map received messages onto different bearers based on different message types of the received messages, so that the DU and the IAB node 2 perform bearer mapping on control plane signaling.

308". The IAB node 1 sends a message #4 to the UE.

Specifically, for 308", refer to the foregoing description in 308'. To avoid repetition, details are not described herein again.

Therefore, in this embodiment of this application, the RRC message and the F1AP message are transmitted on the SRB 1, and the type indication information or the routing information is used, so that the IAB node 2 can determine a message type of an obtained message and can perform bearer mapping on control plane signaling based on different message types.

Optionally, the RRC message and the F1AP message may be alternatively transmitted on the SRB 2, and the type indication information or the routing information is used, so that the IAB node 2 can determine a message type of an obtained message and can perform bearer mapping on control plane signaling based on different message types.

With reference to 310 to 316 in FIG. 3, the following specifically describes a data processing method in this embodiment of this application on an uplink (UL). In a possible implementation, 310 to 316 may be applied to the system shown in FIG. 2. In this case, 310 to 316 in FIG. 3 may be respectively denoted as 310" to 316", that is, a CU, a DU, an IAB node 2, an IAB node 1, and UE in 310" to 316" below may be the corresponding network elements in FIG. 4.

310". The UE sends a message #5 to the IAB node 1.

Specifically, for 310", refer to the foregoing description in 310'. To avoid repetition, details are not described herein again.

312". The IAB node 1 sends a message #6 to the IAB node 2.

In an optional embodiment, the IAB node 1 may generate an IAB 1 RRC message, map the IAB 1 RRC message onto an IAB 1 SRB 1 on a Un 1 interface, and send the IAB 1 RRC message to the IAB node 2. In this case, the IAB 1 RRC message is the message #6.

In an optional embodiment, when receiving a UE RRC message on a UE SRB 1 on a Uu interface, the IAB node 1 may encapsulate the UE RRC message to generate a UE-associated F1AP message, map the UE-associated F1AP message onto the IAB 1 SRB 1 on the Un 1 interface, and send the UE-associated F1AP message to the IAB node 2. In this case, the UE-associated F1AP is the message #6.

In this case, the IAB node 1 needs to send a piece of type indication information to the IAB node 2, to indicate a message type of a message transmitted on the IAB 1 SRB 1. The message type may be an RRC message or an F1AP message, so that the IAB node 2 performs different processing on different messages based on message types. In some possible implementations, the type indication information may be carried in an RLC header field of the Un 1 interface, or may be transmitted on an adaptation layer of the Un 1 interface.

314". The IAB node 2 sends a message #7 to the DU.

In an optional embodiment, the IAB node 2 may generate an IAB 2 RRC message, map the IAB 2 RRC message onto an IAB 2 SRB 1 on a Un 2 interface, and send the IAB 2 RRC message to the DU. In this case, the IAB 1 RRC message is the message #7.

In an optional embodiment, when the IAB node 2 receives a message on the IAB 1 SRB 1 on the Un 1 interface, and a message type of the message is an RRC message, the IAB node 2 encapsulates the IAB 1 RRC message to generate an IAB 1-associated F1AP message, maps the IAB 1-associated F1AP message onto the IAB 2 SRB 1 on the Un 2 interface, and sends the IAB 1-associated F1AP message to the DU. In this case, the IAB-associated F1AP message is the message #7.

In an optional embodiment, when the IAB node 2 receives a message on the IAB 1 SRB 1 on the Un 1 interface, and a message type of the message is an F1AP message, the IAB node 2 maps the F1AP message onto the IAB 2 SRB 1 on the Un 1 interface and sends the F1AP message to the DU. In this case, the UE-associated F1AP message is the message #7.

In this case, the IAB node 2 further needs to send a piece of type indication information to the DU, to indicate a message type of the message transmitted on the IAB 2 SRB 1 on the Un 2 interface. The message type may be an RRC message or an F1AP message, so that the DU performs different processing on different messages based on message types. In some possible implementations, the type indication information may be carried in an RLC header field of the Un 2 interface, or may be transmitted on an adaptation layer of the Un 2 interface.

316". The DU sends a message #8 to the CU.

Specifically, for 316", refer to the foregoing description in 316'. To avoid repetition, details are not described herein again.

Therefore, in this embodiment of this application, the RRC message and the F1AP message are transmitted on the SRB 1, and message indicating types of the messages are sent at the same time, so that the IAB node 2, the IAB node 1, and the DU can perform bearer mapping on control plane signaling based on different message types. In addition, the DU sends a type of a message included in an IAB 2-associated F1AP message to the CU, so that the CU can send decapsulated data packets to different processing layers based on types of different messages included in the IAB 2-associated F1AP message, to implement bearer mapping of control plane signaling.

Optionally, alternatively, the RRC message and the F1AP message may be transmitted on the SRB 2, and message types of the messages are sent at the same time, so that the IAB node 2, the IAB node 1, and the DU can perform bearer mapping on control plane signaling based on different message types. In addition, the DU sends a type of a message included in an IAB 2-associated F1AP message to the CU, so that the CU can send decapsulated data packets to different processing layers based on types of different messages included in the IAB 2-associated F1AP message, to implement bearer mapping of control plane signaling.

In general, in this embodiment of this application, in a downlink direction, the DU maps all messages received from the IAB 2-associated F1AP message onto the IAB 2 SRB 1 or the IAB 2 SRB 2 for transmission. The IAB node 2 learns, based on type indication information sent by the DU, that a message received on the IAB 2 SRB 1 or the IAB 2 SRB 2 is an RRC message and/or an F1AP message, and performs different processing on different messages. If the message is an RRC message, the message is sent to an RRC layer for processing. If the message is an F1AP message, the IAB node 2 learns, based on routing information or node indication information sent by the DU, whether the F1AP message needs to be processed by the IAB node 2. If the F1AP message needs to be processed by the IAB node 2, the IAB node 2 sends the F1AP message to an F1AP layer for processing; otherwise, the IAB node 2 routes the F1AP message to a next-hop node based on the routing information. Similarly, processing performed by the IAB node 1 is similar to processing performed by the IAB node 2, and details are not described herein again. In an uplink direction, the IAB node 2 learns, based on type indication information sent by the IAB node 1, that a message received on the IAB 1 SRB 1 or the IAB 2 SRB 2 is an RRC message and/or an F1AP message. Similarly, the IAB node 2 also sends the type indication information to the DU, and the DU also sends the type indication information to the CU. The CU learns, based on the type indication information sent by the DU, that the IAB 2-associated F1AP message carries an RRC message and/or an F1AP message, and learns, based on node indication information sent by the DU or an IP address on an IP layer, whether the F1AP message is sent to a peer F1AP layer between the CU and the UE for processing or to a peer F1AP layer between the CU and the IAB node 1 for processing.

Figure 5:
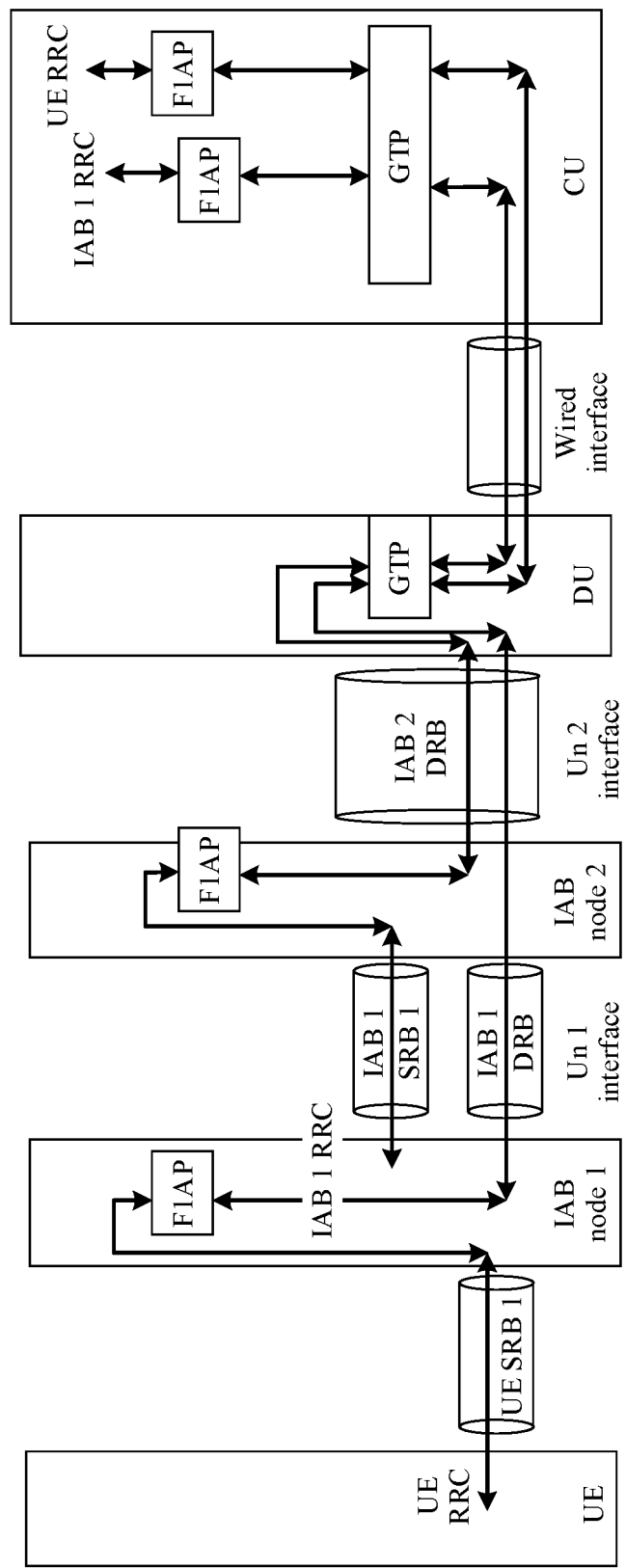
FIG. 5 shows a specific embodiment of bearer mapping and processing that are performed on another piece of control plane signaling on each interface according to this application.

FIG. 5 shows a specific embodiment of bearer mapping and processing that are performed on another piece of control plane signaling on each interface according to this application. Herein, a CU and a DU are located in an IAB donor. Specifically, for the CU, the DU, an IAB node 2, an IAB node 1, and UE, refer to the foregoing descriptions. Details are not described herein again.

Specifically, an SRB 1 of the UE (denoted as a UE SRB 1) is set up on a Uu interface between the UE and the IAB node 1, and an RRC message of the UE (denoted as UE RRC) may be carried on the UE SRB 1 for transmission. Alternatively, an SRB 2 of the UE (denoted as a UE SRB 2) is set up on the Uu interface between the UE and the IAB node 1, and the RRC message of the UE (denoted as UE RRC) may be carried on the UE SRB 2 for transmission.

An SRB 1 of the IAB 1 (denoted as an IAB 1 SRB 1) is set up on a Un 1 interface between the IAB node 1 and the IAB node 2, and an RRC message of the IAB 1 (denoted as IAB 1 RRC) may be carried on the IAB 1 SRB 1 for transmission. Alternatively, an SRB 2 of the IAB 1 (denoted as an IAB 1 SRB 2) is set up on a Un 1 interface between the IAB node 1 and the IAB node 2, and an RRC message of the IAB 1 (denoted as IAB 1 RRC) may be carried on the IAB 1 SRB 2 for transmission.

In an optional embodiment, a DRB of the IAB 1 (denoted as an IAB 1 DRB) may be further set up on the Un 1 interface between the IAB node 1 and the IAB node 2. In some possible implementations, the IAB 1 DRB is a dedicated DRB, may be different from an existing DRB, and is only used to transmit an F1AP message. Alternatively, in some other possible implementations, the IAB 1 DRB may be used to transmit an F1AP message, and may be further used to transmit user plane data.

In this embodiment of this application, the IAB node 1 encapsulates the UE RRC to generate an F1AP message of the UE (denoted as a UE-associated F1AP message). In an example, the UE-associated F1AP message may be carried on the IAB 1 DRB for transmission.

An SRB 1 of the IAB 2 (denoted as an IAB 2 SRB 1) is set up on a Un 2 interface between the IAB node 2 and the DU, and an RRC message of the IAB 2 (denoted as IAB 2 RRC) may be carried on the IAB 2 SRB 1 for transmission. Specifically, for the IAB 2 SRB 1, refer to FIG. 3 or FIG. 4. FIG. 5 focuses on describing the IAB 2 DRB. Therefore, the IAB 2 SRB 1 is not shown in FIG. 5.

In an optional embodiment, a DRB of the IAB 2 (denoted as an IAB 2 DRB) may be further set up on the Un 2 interface between the IAB node 2 and the DU. In some possible implementations, the IAB 1 DRB is a dedicated DRB, may be different from an existing DRB, and is only used to transmit an F1AP message. Alternatively, in some other possible implementations, the IAB 1 DRB may be used to transmit an F1AP message, and may be further used to transmit user plane data. In an example, after receiving the UE-associated F1AP message on the IAB 1 DRB, the IAB 2 may transmit the UE-associated F1AP message on the IAB 2 DRB.

In this embodiment of this application, the IAB node 2 encapsulates the IAB 1 RRC message to generate an IAB 1 F1AP message (denoted as an IAB 1-associated F1AP message). In an example, the IAB 1-associated F1AP message may be carried on the IAB 2 DRB for transmission.

Optionally, the DU may encapsulate at least one of an IAB 1-associated F1AP message or a UE-associated F1AP message into one GTP tunnel corresponding to the IAB 2 to obtain a data packet, and send the data packet to the CU.

Optionally, the DU sends at least one of an IAB 1-associated F1AP message or a UE-associated F1AP message through one GTP tunnel corresponding to the IAB 2 to the CU. The GTP tunnel has a one-to-one mapping relationship with the IAB 2 DRB.

An interface between the DU and CU is a wired interface. Specifically, a GTP tunnel corresponding to the IAB 2 is carried on the wired interface between the DU and the CU, and is used to transmit an F1AP message.

In this embodiment of this application, the IAB node 2 first needs to access a network and then the IAB node 1 accesses the network before the UE accesses the network.

Specifically, in a process of accessing the network, the IAB node 2 sets up, on the Un 2 interface, the IAB 2 SRB 1 used to transmit the IAB 2 RRC message.

In addition, optionally, the CU may trigger the DU to set up a DRB bearer for an F1AP message on the Un 2 interface, that is, an IAB 2 DRB. In an example, the IAB 2 DRB may be used to transmit the UE-associated F1AP message and/or the IAB 1-associated F1AP message. In this case, the IAB 2 DRB may have a one-to-one mapping relationship with one GTP tunnel that corresponds to the IAB 2 and that is between the CU and the DU.

In other words, in this embodiment of this application, at least one of the IAB 1-associated F1AP message or the UE-associated F1AP message is transmitted through a GTP tunnel corresponding to one IAB 2. However, the IAB 2 RRC message is still encapsulated into an IAB 2-associated F1AP message, and the IAB 2-associated F1AP message is sent through a wired interface. In this way, the CU and the DU may determine, based on bearers of different types, types of messages transmitted on the bearers of different types.

In a process of accessing the network, the IAB node 1 sets up, on the Un 1 interface, the IAB 1 SRB 1 for transmitting the IAB 1 RRC message.

In addition, optionally, when the IAB node 1 sets up the IAB 1 SRB 1, the CU may trigger the IAB 1 to set up, on the Un 1 interface, an IAB 1 DRB specially used to transmit an F1AP message. In an example, the IAB 1 DRB may be used to transmit the UE-associated F1AP message. In this case, the IAB 1 DRB on the Un 1 interface has a one-to-one mapping relationship with the IAB 2 DRB on the Un 2 interface. Specifically, the IAB node 2 may obtain a data packet on an IAB 2 DRB, and map the obtained data packet onto an IAB 1 DRB based on the mapping relationship; or the IAB node 2 may obtain a data packet on an IAB 1 DRB, and map the obtained data packet onto an IAB 2 DRB based on the mapping relationship.

In general, in this embodiment of this application, bearer mapping of the UE RRC on each interface is as follows:

On the Uu interface, the UE RRC is mapped onto the SRB 1 or the SRB 2 for transmission. On the Un 1 interface, the UE RRC is encapsulated into the UE-associated F1AP message and then the UE-associated F1AP message is mapped onto the DRB for transmission. On the Un 2 interface, the UE-associated F1AP message is mapped onto the DRB for transmission. On an F1 interface, the UE-associated F1AP message is mapped to a GTP tunnel for transmission. GTP tunnels of F1 interfaces are in one-to-one correspondence with DRBs on Un 2 interfaces.

With reference to 302 to 308 in FIG. 3, the following specifically describes a data processing method in this embodiment of this application on a downlink (DL). In another possible implementation, 302 to 308 may be applied to a system shown in FIG. 5. In this case, 302 to 308 in FIG. 3 may be denoted as 302''' to 308''', that is, a CU, a DU, an IAB node 2, an IAB node 1, and UE in 302''' to 308''' below may be corresponding network elements in FIG. 5.

302''. The CU sends a message #1 to the DU.

The CU may send an IAB 2-associated F1AP message (that is, the message #1) to the DU through the wired interface, where the IAB 2-associated F1AP message includes an IAB 2 RRC message. Specifically, the CU may encapsulate the IAB 2 RRC message to generate the IAB 2-associated F1AP message, and then send the IAB 2-associated F1AP message to the DU.

The CU may send an F1AP message (that is, the message #1) to the DU through a GTP tunnel corresponding to the IAB 2, where the GTP tunnel carries at least one F1AP message in an IAB 1-associated F1AP message or a UE-associated F1AP message.

Specifically, the CU may encapsulate an IAB 1 RRC message to generate the IAB 1-associated F1AP message. The CU may further encapsulate a UE RRC message to generate the UE-associated F1AP message. The CU sends at least one of the IAB 1-associated F1AP message or the UE-associated F1AP message through a GTP tunnel corresponding to the IAB 2 to the DU.

In this way, the DU may determine, based on different bearers on the wired interface, types of messages transmitted on the different bearers.

304''. The DU sends a message #2 to the IAB node 2.

In an optional embodiment, when obtaining the IAB 2-associated F1AP message through the wired interface, the DU decapsulates the IAB 2-associated F1AP message to extract the IAB 2 RRC message, maps the IAB 2 RRC message onto an IAB 2 SRB 1 or an IAB 2 SRB 2, and sends the IAB 2 RRC message to the IAB node 2. In this case, the IAB 2 RRC message is the message #2.

In another optional embodiment, when obtaining an F1AP through the GTP tunnel of the IAB 2, the DU maps the F1AP message onto an IAB 2 DRB corresponding to a Un 2 interface, and sends the F1AP message to the IAB 2. In this case, the F1AP message is the message #2.

Optionally, if the IAB 2 DRB may further send user plane data in addition to the F1AP message, the DU further needs to send indication information to the IAB 2, to indicate a type of data sent on the IAB 2 DRB. The data type may be an F1AP message, or may be user plane data.

Optionally, the DU may further send indication information to the IAB node 2, where the indication information is used to indicate whether the IAB node 2 needs to process the F1AP message. In some possible implementations, the indication information may be carried in an RLC header field of the Un 2 interface, or on an adaptation layer of the Un 2 interface.

Therefore, in this embodiment of this application, the DU performs bearer mapping on control plane signaling by sending the F1AP message through the GTP tunnel.

306''. The IAB node 2 sends a message #3 to the IAB node 1.

In an optional embodiment, when receiving a message on the IAB 2 SRB 1 on the Un 2 interface, the IAB node 2 may determine that the message is the IAB 2 RRC message. In this case, the IAB node 2 may directly send the message to an RRC layer for processing.

In an optional embodiment, when the IAB 2 DRB is specially used to transmit the F1AP message, if receiving data on the IAB 2 DRB on the Un 2 interface, the IAB node 2 may determine that the message is the F1AP message. Alternatively, the IAB 2 may determine, with reference to the indication information, that the message transmitted on the IAB 2 DRB is the F1AP message.

In this case, in an optional embodiment, the IAB 2 may determine, with reference to routing information of the F1AP message, whether the F1AP message needs to be processed by the IAB 2. Specifically, when the routing information of the F1AP message indicates that a target routing node of the F1AP message is the IAB 1, it indicates that the F1AP message needs to be processed by the IAB node 2. In this case, the IAB 2 decapsulates the F1AP message. When learning that the F1AP message carries the IAB 1 RRC message, the IAB node 2 sends the IAB 1 RRC message to the IAB node 1 on the IAB 1 SRB 1 on the Un 1 interface. In this case, the IAB 1 RRC message is the message #3.

When the routing information of the F1AP message indicates that the target routing node of the F1AP message is not a next-hop node connected to the IAB node 2, for example, when the target routing node is UE, it indicates that the F1AP message does not need to be processed by the IAB node 2. In this case, the IAB node 2 maps the F1AP message onto the corresponding IAB 1 DRB on the Un 1 interface, and sends the F1AP message to the IAB node 1. In this case, the F1AP message is the message #3.

In another optional embodiment, the IAB node 2 may determine, with reference to the indication information sent by the DU to the IAB 2, whether the F1AP message on the IAB 2 RB needs to be processed by the IAB node 2. Specifically, when determining, based on the indication information, that the IAB node 2 needs to process the F1AP message, the IAB node 2 decapsulates the F1AP message. When learning that the F1AP message carries an IAB 1 RRC message, the IAB node 2 maps the IAB 1 RRC message onto the IAB 1 SRB 1 on the Un 1 interface and sends the IAB 1 RRC message to the IAB node 1. In this case, the IAB 1 RRC message is the message #3.

When determining, based on the indication information, that the F1AP message does not need to be processed by the IAB node 2, the IAB 2 maps the F1AP message onto the corresponding IAB 1 DRB on the Un 1 interface and sends the F1AP message to the IAB node 1. In this case, the F1AP message is the message #3.

Optionally, if the IAB 1 DRB may further send user plane data in addition to the F1AP message, the IAB node 2 further needs to send indication information to the IAB node 1 when sending the F1AP message on the IAB 1 DRB, where the indication information is used to indicate a type of data sent on the IAB 1 DRB. The data type may be the F1AP message or the user plane data.

308'''. The IAB node 1 sends a message #4 to the UE.

In an optional embodiment, when receiving a message on the IAB 1 SRB 1 on the Un 1 interface, the IAB node 1 may determine that the message is an IAB 1 RRC message. In this case, the IAB node 1 may directly send the message to an RRC layer for processing.

In an optional embodiment, when the IAB 1 DRB is used only to transmit the F1AP message, if receiving data on the IAB 1 DRB on the Un 1 interface, the IAB node 1 may determine that the message is the F1AP message. Alternatively, the IAB 1 may determine, with reference to the indication information, that a message transmitted on the IAB 1 DRB is the F1AP message.

Specifically, the IAB node 1 decapsulates the F1AP message. When learning that the F1AP message carries a UE RRC message, the IAB node 1 maps the UE RRC message onto the UE SRB 1 on the Uu interface, and sends the UE RRC message to the UE. In this case, the UE RRC message is the message #4.

Therefore, in this embodiment of this application, the F1AP message is transmitted on the DRB, to implement bearer mapping of control plane signaling.

With reference to 310 to 316 in FIG. 3, the following specifically describes a data processing method in this embodiment of this application on an uplink (UL). In a possible implementation, 310 to 316 may be applied to the system shown in FIG. 5. In this case, 310 to 316 in FIG. 3 may be respectively denoted as 310''' to 316''', that is, a CU, a DU, an IAB node 2, an IAB node 1, and UE in 310''' to 316''' below may be corresponding network elements in FIG. 5.

310''. The UE sends a message #5 to the IAB node 1.

Specifically, the UE generates a UE RRC message, and sends the UE RRC message to the IAB 1 on a UE SRB 1 on a Uu interface. In this case, the UE RRC message is the message #5.

312'''. The IAB node 1 sends a message #6 to the IAB node 2.

In an optional embodiment, the IAB node 1 may generate an IAB 1 RRC message and send the IAB 1 RRC message to the IAB node 2 on an IAB 1 SRB 1 on a Un 1 interface. In this case, the IAB 1 RRC message is the message #6.

In an optional embodiment, when receiving the UE RRC message on the UE SRB 1 on the Uu interface, the IAB node 1 encapsulates the UE RRC message to generate a UE-associated F1AP message, maps the UE-associated F1AP message onto an IAB 1 DRB on the Un 1 interface, and sends the UE-associated F1AP message to the IAB 2. In this case, the UE-associated F1AP is the message #6.

314''. The IAB node 2 sends a message #7 to the DU.

In an optional embodiment, the IAB node 2 may generate an IAB 2 RRC message, and send the IAB 2 RRC message to the DU on an IAB 2 SRB 1 on a Un 2 interface. In this case, the IAB 2 RRC message is the message #7.

In an optional embodiment, when receiving an IAB 1 RRC message on the IAB 1 SRB 1 on the Un 1 interface, the IAB node 2 encapsulates the IAB 1 RRC message to generate an IAB 1-associated F1AP message, maps the IAB 1-associated F1AP message onto the IAB 2 DRB on the Un 2 interface, and sends the IAB 1-associated F1AP message to the DU. In this case, the IAB-associated F1AP is the message #7.

In an optional embodiment, when receiving a UE-associated F1AP message on the IAB 1 DRB on the Un 1 interface, the IAB node 2 may directly map the UE-associated F1AP message onto the IAB 2 DRB and send the UE-associated F1AP message to the DU. In this case, the UE-associated F1AP message is the message #7.

316'. The DU sends a message #8 to the CU.

In an optional embodiment, the DU encapsulates an IAB 2 RRC message received on the IAB 2 SRB 1 to generate an IAB 2-associated F1AP message, and sends the IAB 2-associated F1AP message to the CU through a wired interface. In this case, the IAB 2-associated F1AP is the message #8.

In an optional embodiment, the DU may send a message in the IAB 1 associated F1AP message or the UE-associated F1AP message to the CU through a GTP tunnel on a wired interface, where the GTP tunnel has a one-to-one mapping relationship with the IAB 2 DRB. In this case, the IAB 1-associated F1AP is the message #8.

In this case, the CU may determine that an IAB 2-associated F1AP message is received on a peer F1AP layer between the CU and the IAB 2, and an F1AP message is received through the GTP tunnel that has a one-to-one mapping relationship with the IAB 2 DRB, and perform, based on an IP address on an IP layer or a node identifier, different processing on different F1AP messages received through the GTP tunnel.

Specifically, the CU decapsulates the IAB 2-associated F1AP message. When learning that the F1AP message carries an IAB 2 RRC message, the CU sends the IAB 2 RRC message to a peer RRC layer between the CU and the IAB 2 for processing.

When the CU receives the F1AP message through the GTP tunnel corresponding to the IAB 2 DRB, the CU may determine a message type of the F1AP message based on the IP address carried on the IP layer or the node identifier carried in a GTP tunnel header field, where the message type may be a UE-associated F1AP message or may be an IAB 1-associated F1AP message. When the CU determines that the F1AP message is the UE-associated F1AP message, the CU sends the UE-associated F1AP message to a peer F1AP layer between the CU and the UE for processing. Further, the CU decapsulates the UE-associated F1AP message on the peer F1AP layer between the CU and the UE, to obtain a UE RRC message. When the CU determines that the F1AP message is the IAB 1-associated F1AP message, the CU sends the IAB 1-associated F1AP message to a peer F1AP layer between the CU and the IAB 1 for processing. Further, the CU decapsulates the IAB 1-associated F1AP message on the peer F1AP layer between the CU and the IAB 1, to obtain an IAB 1 RRC message.

Optionally, the DU may send the node identifier to the CU, or may carry the node identifier on an adaptation layer above a GTP layer.

Therefore, in this embodiment of this application, the RRC message is transmitted on the SRB 1, the F1AP message is transmitted on the DRB, and the F1AP message is transmitted through the GTP tunnel, to implement bearer mapping and processing of control plane signaling.

In this embodiment of this application, different from bearer mapping in LTE, in NR, a more fine-grained quality of service (QoS) mechanism is used, that is, bearer mapping that is based on a flow granularity. Specifically, for UE directly attached to an IAB donor, corresponding bearer setup and bearer mapping include: mapping a QoS flow of the UE onto a DRB on a Uu interface between the UE and the DU for transmission, and mapping, the QoS flow that is of the UE and that is between the DU and the CU, to a GTP tunnel for transmission, where the GTP tunnel has a one-to-one mapping relationship with the DRB of the UE on the Uu interface.

For the scenario shown in FIG. 1, when a system includes an IAB donor, an IAB node 1, an IAB node 2, and UE, user plane data of the UE does not need to be transmitted through a UPF of any IAB node. Specifically, in this embodiment of this application, a DRB bearer is set up on an interface, for example, a Un interface (such as a Un 1 interface or a Un 2 interface), between IAB nodes, and a Uu interface between an IAB node and UE. In addition, each IAB node may perform bearer mapping on user plane data based on a mapping relationship between DRB bearers on interfaces, or based on a QoS parameter corresponding to a DRB bearer, or based on a QoS parameter to which a UE service flow belongs. Herein, the QoS parameter may include information related to quality of the service flow, such as a delay, and/or a packet loss rate, and/or a guaranteed flow bit rate GFBR (Guaranteed Flow Bit Rate), and/or a maximum flow bit rate (Maximum Flow Bit Rate) corresponding to the service flow.

In general, in this embodiment of this application, in the downlink direction, both the IAB node 1 and the IAB node 2 may learn, based on routing information or node indication information sent by a previous-hop node, whether an F1AP message needs to be processed by the IAB node 1 and the IAB node 2. If the F1AP message needs to be processed by the IAB node 1 and the IAB node 2, the IAB node 1 and the IAB node 2 send the F1AP message to an F1AP layer for processing; otherwise, the F1AP layer routes the F1AP message to a next-hop node based on the routing information. On the Un interface, if the F1AP message and data that is of the UE use a same DRB, the next-hop node further needs to obtain type indication information from the previous-hop node, where the type indication information is used to indicate that the F1AP message and/or the data are/is transmitted on the DRB.

The following describes in detail the data processing method in the embodiments of this application with reference to specific embodiments. It should be noted that the following is merely intended to help a person skilled in the art understand and implement the embodiments of this application, but is not intended to limit the scope of the embodiments of this application. A person skilled in the art may perform equivalent transformation or modification based on the example provided herein, and such transformation or modification should still fall within the scope of the embodiments of this application.

Figure 6A:
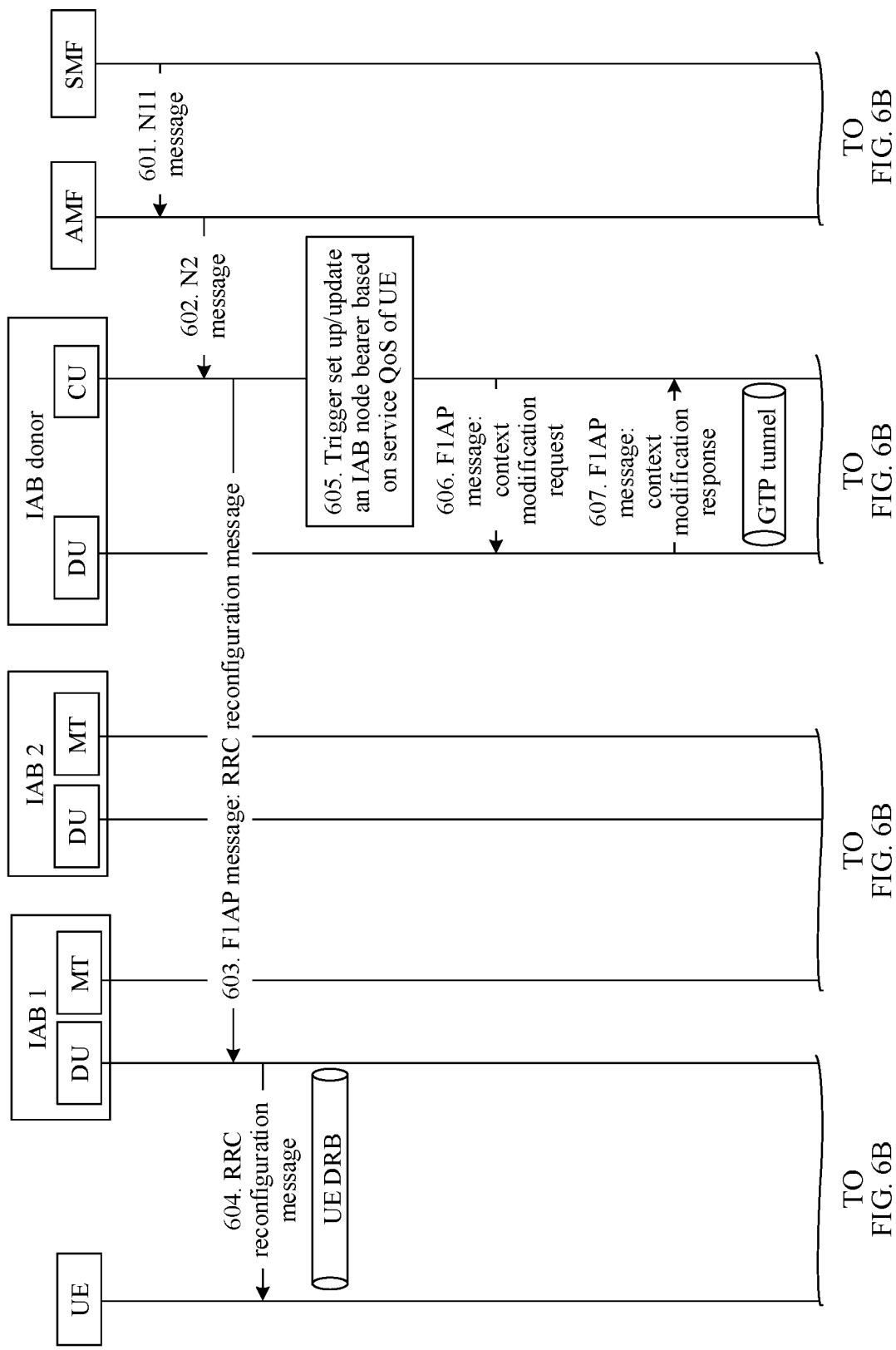
FIG. 6A and FIG. 6B show a specific embodiment of bearer mapping and processing that are performed on a piece of user plane data on each interface according to this application.
Figure 6B:
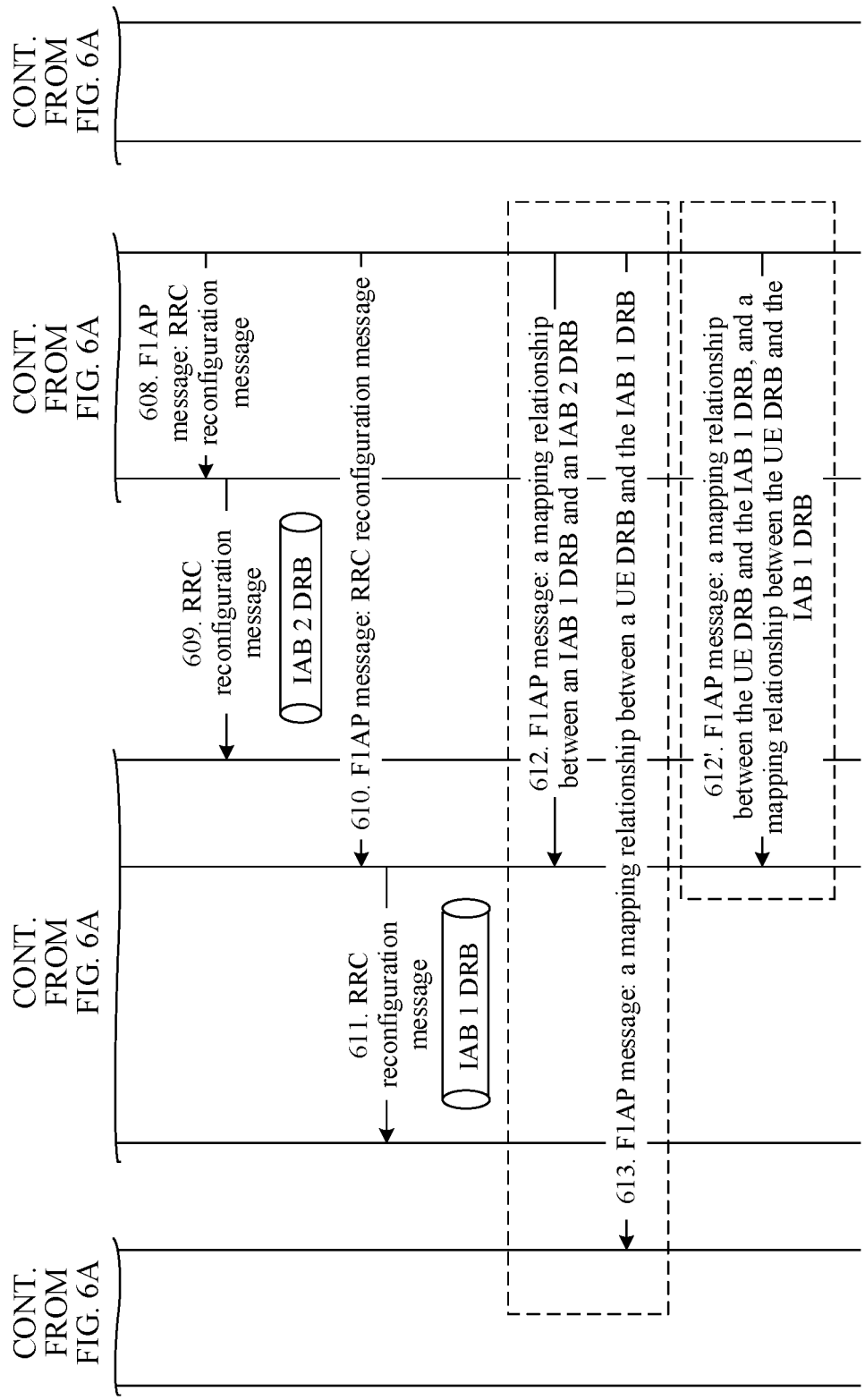

FIG. 6A and FIG. 6B show a specific embodiment of bearer mapping and processing that are performed on a piece of user plane data on each interface according to this application. Herein, for an IAB donor, an IAB node 2, an IAB node 1, and UE, refer to the foregoing description. Details are not described herein again.

It should be understood that FIG. 6A and FIG. 6B show steps or operations of the data processing method. However, these steps or operations are merely examples. In this embodiment of this application, other operations or variations of the operations in FIG. 6A and FIG. 6B may be further performed. In addition, the steps in FIG. 6A and FIG. 6B may be performed in a sequence different from that shown in FIG. 6A and FIG. 6B, and possibly, not all operations in FIG. 6A and FIG. 6B need to be performed.

601. A session management function (SMF) of the UE sends an N11 message to an access and mobility management function (AMF) of the UE, where the N11 message includes an identifier (PDU session ID) of a session that the UE requests to establish, and a QoS flow identifier (QFI), a QoS parameter (profile), and the like of a service flow included in the PDU session. This is not specifically limited in this embodiment of this application.

602. The AMF of the UE sends an N2 message to a CU in the IAB donor. The N2 message includes the session identifier (PDU session ID), the QFI, the QoS profile, and the like. This is not specifically limited in this embodiment of this application.

603. The CU in the IAB donor allocates a DRB ID to the UE service flow based on the QoS information of the UE service flow obtained from the AMF, and triggers the UE and a DU in the IAB node 1 to set up a DRB bearer corresponding to the DRB ID. That is, the CU in the IAB donor sends a UE-associated F1AP message to the DU in the IAB node 1, where the UE-associated F1AP message includes an RRC reconfiguration message of the UE. Herein, the RRC reconfiguration message includes information such as the session identifier and the DRB ID. This is not limited in this embodiment of this application.

Specifically, for sending the UE-associated F1AP message by the CU to the IAB node 1, refer to the foregoing description. To avoid repetition, details are not described herein again.

604. The DU in the IAB node 1 extracts the RRC reconfiguration message from the UE-associated F1AP message that is in 603, and sends the RRC reconfiguration message to the UE.

Specifically, for sending the RRC message by the IAB node 1 to the UE, refer to the foregoing description. To avoid repetition, details are not described herein again.

Correspondingly, the UE receives the RRC reconfiguration message sent by the IAB node 1, and sets up, based on the information such as the session identifier and the DRB ID in the RRC reconfiguration message, a UE DRB bearer corresponding to the DRB ID.

Optionally, in step 605, after the UE accesses a network, the CU in the IAB donor may trigger to set up/update a user plane bearer of an IAB node on the Un interface based on obtained QoS information of the service flow of the UE.

Alternatively, in this embodiment of this application, when accessing a network, the IAB node 1 and the IAB node 2 may set up corresponding DRB bearers, for all service flows of the UE, on Un interfaces in advance.

606. The CU sends an IAB 2-associated F1AP message to the DU, where the IAB 2-associated F1AP message is a UE context modification request.

607. The DU sends an IAB 2-associated F1AP message to the CU as a response to the message received in 606, where the response message is a UE context modification response.

After processing in the steps 606 and 607, a corresponding GTP tunnel is set up between the DU and the CU for the service flow of the UE.

608. The CU sends an IAB 2-associated F1AP message to the DU, where the IAB 2-associated F1AP includes an RRC reconfiguration message of the IAB node 2. Herein, the RRC reconfiguration message is used to set up a corresponding UE DRB between the UE and the DU in the IAB node 1 for the service flow of the UE. The UE DRB has a one-to-one mapping relationship with the GTP tunnel set up between the CU and the DU. Specifically, for sending the IAB 2-associated F1AP message by the CU to the IAB node 2, refer to the foregoing description. To avoid repetition, details are not described herein again.

609. The DU extracts the RRC reconfiguration message from the IAB 2-associated F1AP message that is in 608, and sends the RRC reconfiguration message to an MT of the IAB node 2. Specifically, for sending the RRC message by the DU to the IAB node 2, refer to the foregoing description. To avoid repetition, details are not described herein again.

In this case, the IAB node 2 sets up a corresponding IAB 2 DRB for the service flow of the UE on the Un 2 interface based on the RRC reconfiguration message.

610. The CU sends an IAB 1-associated F1AP message to a DU in the IAB node 2, where the IAB 1-associated F1AP includes an RRC reconfiguration message of the IAB node 1. Herein, the RRC reconfiguration message is used to set up a corresponding IAB 1 DRB between the IAB node 1 and the IAB node 2 for the service flow of the UE. Specifically, for sending the F1AP message by the CU to the IAB node 1, refer to the foregoing description. To avoid repetition, details are not described herein again.

611. The DU in the IAB node 2 extracts the RRC reconfiguration message from the IAB 1-associated F1AP message that is in 610, and sends the RRC reconfiguration message to an MT of the IAB node 1. Specifically, for sending the RRC message by the IAB node 2 to the IAB node 1, refer to the foregoing description. To avoid repetition, details are not described herein again.

In this case, the IAB node 1 sets up a corresponding IAB 1 DRB for the service flow of the UE on the Un 1 interface based on the RRC reconfiguration message.

Optionally, in this embodiment of this application, the CU may perform QoS mapping management on all interface links. In a possible implementation, the CU may send a bearer mapping relationship of each interface to the IAB node 1 and the IAB node 2 in the following 612 and 613. In another possible implementation, the CU may send a bearer mapping relationship of each interface to only the IAB node 2 in 612'.

612. The CU sends an IAB 1-associated F1AP message to the DU in the IAB node 2, where the IAB 1-associated F1AP message includes a mapping relationship between the IAB 1 DRB on the Un 1 interface and the IAB 2 DRB on the Un 2 interface. For example, an IAB 1 DRB 1 and an IAB 1 DRB 2 exist on the Un 1 interface, and an IAB 2 DRB 1 and an IAB 2 DRB 2 exist on the Un 2 interface. The CU determines a mapping relationship between the IAB 1 DRB on the Un 1 interface and the IAB 2 DRB on the Un 2 interface. If determining that the IAB 1 DRB 1 has a one-to-one mapping relationship with the IAB 2 DRB 1, and the IAB 1 DRB 2 has a one-to-one mapping relationship with the IAB 2 DRB 2, the CU sends the two mapping relationships to the IAB node 2. If determining that both the IAB 1 DRB 1 and the IAB 1 DRB 2 have a mapping relationship with the IAB 2 DRB 1, or both the IAB 1 DRB 1 and the IAB 1 DRB 2 have a mapping relationship with the IAB 2 DRB 2, or both the IAB 2 DRB 1 and the IAB 2 DRB 2 have a mapping relationship with the IAB 1 DRB 1, or both the IAB 2 DRB 1 and the IAB 2 DRB 2 have a mapping relationship with the IAB 1 DRB 2, the CU sends a determined mapping relationship to the IAB node 2.

The foregoing one-to-one mapping is used as an example. For a DL, the IAB node 2 maps a data packet received on the IAB 2 DRB 1 to the IAB 1 DRB 1 for transmission, and maps a data packet received on the IAB 2 DRB 2 to the IAB 1 DRB 2 for transmission. For a UL, the IAB node 2 maps a data packet received on the IAB 1 DRB 1 to the IAB 2 DRB 1 for transmission, and maps a data packet received on the IAB 1 DRB 2 to the IAB 2 DRB 2 for transmission.

Specifically, for sending the IAB 1-associated F1AP message by the CU to the DU of the IAB node 2, refer to the foregoing description. To avoid repetition, details are not described herein again.

613. The CU sends a UE-associated F1AP message to the DU in the IAB node 1, where the UE-associated F1AP message includes a mapping relationship between the UE DRB and the IAB 1 DRB. The mapping relationship between the UE DRB on the Uu interface and the IAB 1 DRB on the Un 1 interface is consistent with that described in 612, and may be a one-to-one mapping relationship, a many-to-one mapping relationship, or one-to-many mapping relationship. Details are not described herein again.

Specifically, for sending the UE-associated F1AP message by the CU to the DU in the IAB node 1, refer to the foregoing description. To avoid repetition, details are not described herein again.

In this case, for the DL, when the CU maps a service flow of the UE to a GTP tunnel and sends the service flow to the DU, the DU may map, based on a mapping relationship between the IAB 2 DRB and the GTP tunnel, the service flow of the UE onto the IAB 2 DRB corresponding to the Un 2 interface and send the service flow to the IAB node 2.

Then, the IAB node 2 may map the UE service flow onto the IAB 2 DRB on the Un 2 interface to the IAB 1 DRB on the Un 1 interface based on a received mapping relationship between the IAB 1 DRB and the IAB 2 DRB, and send the UE service flow to the IAB node 1.

Then, the IAB node 1 maps, based on the received mapping relationship between the IAB 1 DRB and the UE DRB, the UE service that is on the IAB 1 DRB on the Un 1 interface onto the UE DRB corresponding to the Uu interface, and sends the UE service to the UE.

Similarly, for the UL, the IAB node 1 and the IAB node 2 may perform user plane bearer mapping based on mapping relationships between DRBs on different interfaces, and the DU may perform user plane bearer mapping between the CU and the DU based on a correspondence between the IAB 2 DRB and the GTP tunnel. Finally, the UE service is sent to the CU.

612'. The CU sends an F1AP message to the DU in the IAB node 2, where the F1AP message includes the mapping relationship between the IAB 1 DRB and the IAB 2 DRB, and the mapping relationship between the UE DRB and the IAB 1 DRB.

In this case, when sending user plane data, the IAB node 2 may determine, based on the mapping relationship between the UE DRB and the IAB 1 DRB, the UE DRB onto which the IAB node 1 needs to map the user data transmitted on the IAB 1 DRB. Then, the IAB node 2 may send indication information to the IAB node 1, where the indication information is used to indicate the IAB node 1 to perform user plane bearer mapping. Specifically, the indication information may be an identifier DRB ID of the UE DRB, so that the IAB node 1 maps, based on the indication information, user data received on the IAB 1 DRB onto the corresponding UE DRB.

In this case, for the downlink, when the CU maps a service flow of the UE to a corresponding GTP tunnel and sends the service flow to the DU, the DU may map the service flow of the UE onto an IAB 2 DRB based on a mapping relationship between the IAB 2 DRB and the GTP tunnel between the CU and the DU, and send the service flow of the UE to the IAB node 2.

Then, the IAB node 2 may map the UE service that is on the IAB 2 DRB onto the IAB 1 DRB based on a received mapping relationship between the IAB 1 DRB and the IAB 2 DRB, and send the UE service to the IAB node 1. In addition, the IAB node 2 determines, based on a received mapping relationship between the IAB 1 DRB and the UE DRB after the IAB node 1 receives the UE service flow on the IAB 1 DRB, the UE DRB onto which the UE service flow needs to be mapped, and sends, to the IAB node 1, indication information used to indicate the UE DRB. In an example, the indication information may be carried on an adaptation layer.

After receiving the UE service flow on the IAB 1 DRB and receiving the indication information, the IAB node 1 may map the UE service flow onto the corresponding UE DRB and send the UE service flow to the UE.

Similarly, for the UL, the IAB node 1 may perform UL mapping in a reflective manner, the IAB node 2 may perform UL mapping based on the mapping relationship between the IAB 1 DRB and the IAB 2 DRB, and the DU may perform UL mapping based on the correspondence between the IAB 2 DRB and the GTP tunnel. Finally, the UE service is sent to the CU.

Therefore, in this embodiment of this application, the CU performs QoS mapping management on all interface links, so that bearer mapping can be performed on user plane data.

Figure 7B:
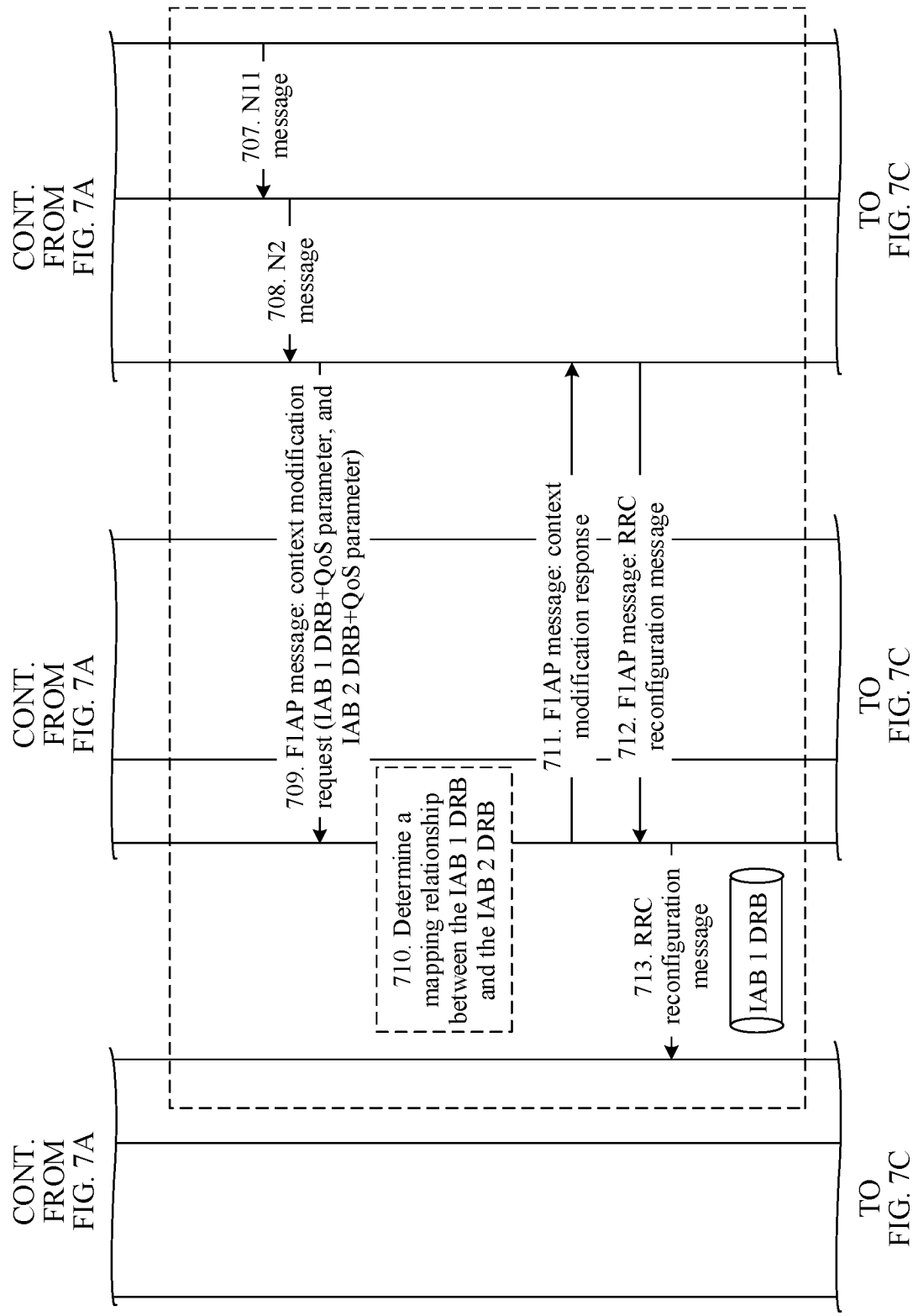
Figure 7C:
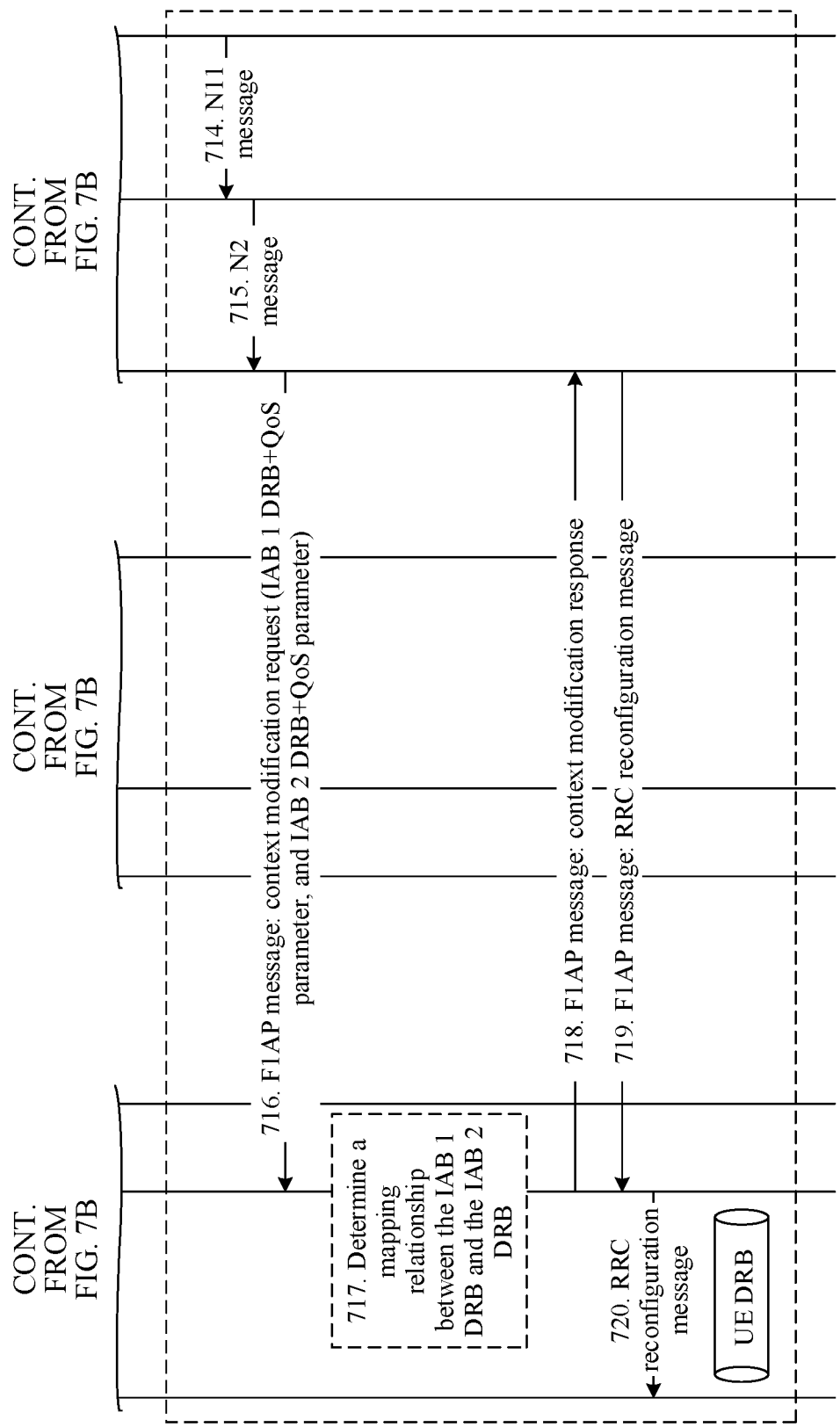

FIG. 7A, FIG. 7B, and FIG. 7C show a specific embodiment of bearer mapping performed on a piece of user plane data on each interface according to this application. Herein, for an IAB donor, an IAB node 2, an IAB node 1, and UE, refer to the foregoing description. Details are not described herein again.

It should be understood that FIG. 7A, FIG. 7B, and FIG. 7C show steps or operations of the data processing method. However, these steps or operations are merely examples. In this embodiment of this application, other operations or variations of the operations in FIG. 7A, FIG. 7B, and FIG. 7C may be further performed. In addition, the steps in FIG. 7A, FIG. 7B, and FIG. 7C may be performed in a sequence different from that shown in FIG. 7A, FIG. 7B, and FIG. 7C, and possibly, not all operations in FIG. 7A, FIG. 7B, and FIG. 7C need to be performed.

701. An SMF of the UE sends an N11 message to an AMF of the UE. Specifically, for 701, refer to the description in 601. To avoid repetition, details are not described herein again.

702. The AMF of the UE sends an N2 message to a CU in the IAB donor. Specifically, for 702, refer to the description in 602. To avoid repetition, details are not described herein again.

703. The CU in the IAB donor sends an IAB 2-associated F1AP message to a DU in the IAB donor, where the IAB 2-associated F1AP message may be a UE context modification request. Specifically, for 703, refer to the foregoing description in 606. To avoid repetition, details are not described herein again.

704. After receiving the IAB 2-associated F1AP message that is in 703, the DU sends the IAB 2-associated F1AP message to the CU, where the IAB 2-associated F1AP message may be a UE context modification response. Specifically, for 704, refer to the foregoing description in 607. To avoid repetition, details are not described herein again.

In this case, the DU sets up a corresponding GTP tunnel between the CU and the DU for a UE service flow.

705. The CU in the IAB donor sends an IAB 2-associated F1AP message to the DU in the IAB donor, where the IAB 2-associated F1AP message includes an RRC reconfiguration message of the IAB node 2. Specifically, for 705, refer to the foregoing description in 608. To avoid repetition, details are not described herein again.

706. The DU extracts the RRC reconfiguration message from the IAB 2-associated F1AP message that is in 705, and sends the RRC reconfiguration message to an MT of the IAB node 2. Specifically, for sending the RRC message by the DU to the IAB node 2, refer to the foregoing description. To avoid repetition, details are not described herein again.

In this case, the IAB node 2 sets up, on a Un 2 interface based on the RRC reconfiguration message, an IAB 2 DRB that has a one-to-one mapping relationship with the GTP tunnel.

In this way, the IAB 2 DRB and the GTP tunnel corresponding to the IAB 2 DRB may be set up in 701 to 706.

707. The SMF sends an N11 message to the AMF.

708. The AMF sends an N2 message to the CU in the IAB donor, to request the CU to establish a PDU session.

709. The CU in the IAB donor sends an IAB 1-associated F1AP message to a DU in the IAB node 2, where the IAB 1-associated F1AP message may be a UE context modification request. Specifically, the context modification request includes the IAB 2 DRB, QoS profile information corresponding to the IAB 2 DRB, an IAB 1 DRB, and QoS profile information corresponding to the IAB 1 DRB. The QoS profile information includes a 5G QoS identifier 5QI, a GFBR, an MFBR, and the like.

710. The IAB node 2 determines a mapping relationship between the IAB 2 DRB and the IAB 1 DRB based on information obtained in 709. In this case, the IAB node performs bearer mapping for each IAB.

711. The DU in the IAB node 2 sends a UE context modification response to the CU in the IAB donor.

712. The CU sends an IAB 2-associated F1AP message to the IAB node 2, where the IAB 2-associated F1AP message includes an RRC reconfiguration message of the IAB node 1. Specifically, for 712, refer to the description in 610. To avoid repetition, details are not described herein again,

713. The DU in the IAB node 2 extracts the RRC reconfiguration message from the IAB 2-associated F1AP message that is in 712, and sends the RRC reconfiguration message to an MT of the IAB node 1. Specifically, for 713, refer to the description in 611. To avoid repetition, details are not described herein again.

In this case, the IAB node 1 sets up the IAB 1 DRB based on the RRC reconfiguration message.

714. The SMF of the UE sends an N11 message to the AMF of the UE.

715. The AMF of the UE sends an N2 message to the CU in the IAB donor.

716. The CU in the IAB donor sends a UE-associated F1AP message to a DU in the IAB node 1, where the UE-associated F1AP message may be a UE context modification request. Specifically, the context modification request includes the IAB 1 DRB, QoS profile information corresponding to the IAB 1 DRB, a UE DRB, and QoS profile information corresponding to the UE DRB.

717. The IAB node 1 determines a mapping relationship between the IAB 1 DRB and the UE DRB based on information obtained in 716. In this case, the IAB node performs bearer mapping for each IAB.

718. The DU in the IAB node 1 sends a UE context modification response to the CU in the IAB donor.

719. The CU sends a UE-associated F1AP message to the DU in the IAB node 1, where the UE-associated F1AP message includes an RRC reconfiguration message of the UE. Specifically, for 719, refer to the description in 603. To avoid repetition, details are not described herein again,

720. The DU in the IAB node 1 extracts the RRC reconfiguration message from the UE-associated F1AP message that is in 719, and sends the RRC reconfiguration message to the UE. Specifically, for 713, refer to the description in 604. To avoid repetition, details are not described herein again.

In this case, the UE sets up the UE DRB based on the RRC reconfiguration message.

In general, for the DL, when the CU maps the service flow of the UE to a corresponding GTP tunnel and sends the service flow to the DU, the DU may map the service flow of the UE to the IAB 2 DRB based on a mapping relationship between the IAB 2 DRB and the GTP tunnel, and send the service flow of the UE to the IAB node 2.

Then, the IAB node 2 may map the UE service that is on the IAB 2 DRB onto the IAB 1 DRB based on a received mapping relationship between the IAB 1 DRB and the IAB 2 DRB, and send the UE service to the IAB node 1.

Then, the IAB node 1 maps the UE service that is on the IAB 1 DRB onto the UE DRB based on a received mapping relationship between the IAB 1 DRB and the UE DRB, and sends the UE service to the UE.

Similarly, for the UL, the IAB node 1 and the IAB node 2 may perform mapping based on mapping relationships between DRBs, and the DU may perform mapping based on a correspondence between the IAB 2 DRB and the GTP tunnel. Finally, the UE service is sent to the CU.

Figure 8:
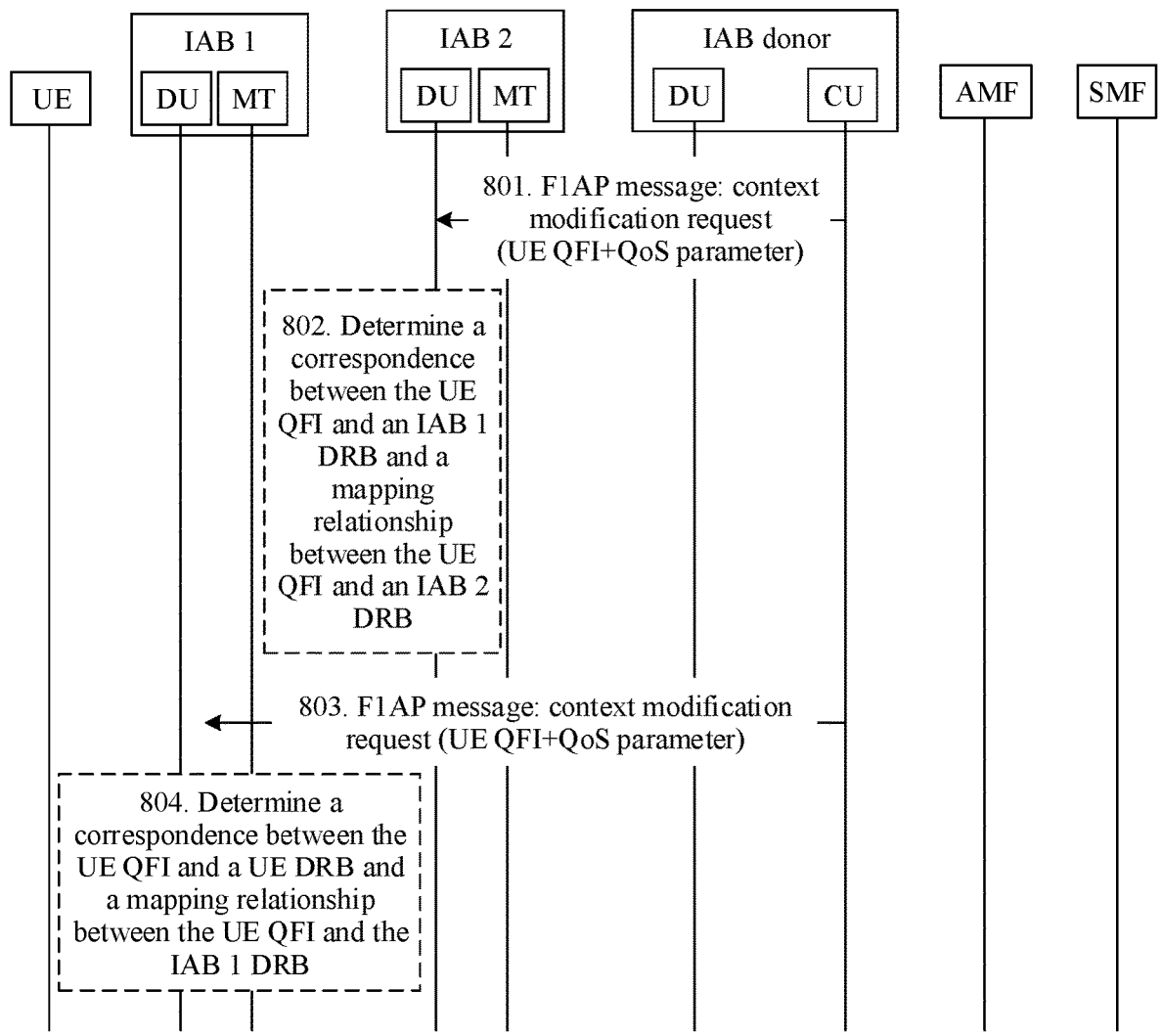
FIG. 8 shows a specific embodiment of bearer mapping performed on a piece of user plane data on each interface according to this application.

In some possible implementations, in this embodiment of this application, the steps 710 and 717 shown in FIG. 7A, FIG. 7B, and FIG. 7C may not be performed, and steps 801 to 804 shown in FIG. 8 may be further performed. Specifically, after accessing a network, the UE sets up a corresponding service bearer, and the CU sends a relationship between a QFI of the UE and a QoS profile of the UE to the IAB node 1 and the IAB node 2. A specific procedure is as follows:

801. A CU in an IAB donor may send an IAB 1-associated F1AP message to a DU in an IAB node 2, where the IAB 1-associated F1AP message may be a UE context modification request. Specifically, the context modification request includes a correspondence between a QFI of a UE service and a QoS profile of the UE service.

802. For the DL, the IAB node 2 determines a correspondence between the UE QFI and an IAB 1 DRB based on the IAB 1 DRB, QoS profile information corresponding to the IAB 1 DRB, and the correspondence between the QFI of the UE service and the QoS profile of the UE service. For the UL, the IAB node 2 determines a correspondence between the UE QFI and an IAB 2 DRB based on the IAB 2 DRB, QoS profile information corresponding to the IAB 2 DRB, and the correspondence between the QFI of the UE service and the QoS profile of the UE service.

803. The CU in the IAB donor may send a UE-associated F1AP message to a DU in an IAB node 1, where the UE-associated F1AP message may be a UE context modification request. Specifically, the context modification request includes a correspondence between a QFI of a UE service and a QoS profile of the UE service.

804. For the DL, the IAB node 1 determines a correspondence between the UE QFI and a UE DRB based on the UE DRB, QoS profile information corresponding to the UE DRB, and the correspondence between the QFI of the UE service and the QoS profile of the UE service. For the UL, the IAB node 1 determines a correspondence between the UE QFI and an IAB 1 DRB based on the IAB 1 DRB, QoS profile information corresponding to the IAB 1 DRB, and the correspondence between the QFI of the UE service and the QoS profile of the UE service. In some possible implementations, the correspondence between the QFI of the UE service and the QoS profile of the UE service may be fixed, that is, may be stored in the IAB node 1 and the IAB node 2.

Therefore, in this embodiment of this application, the IAB node performs distributed bearer mapping management on interface links, so that bearer mapping can be performed on user plane data.

Figure 9:
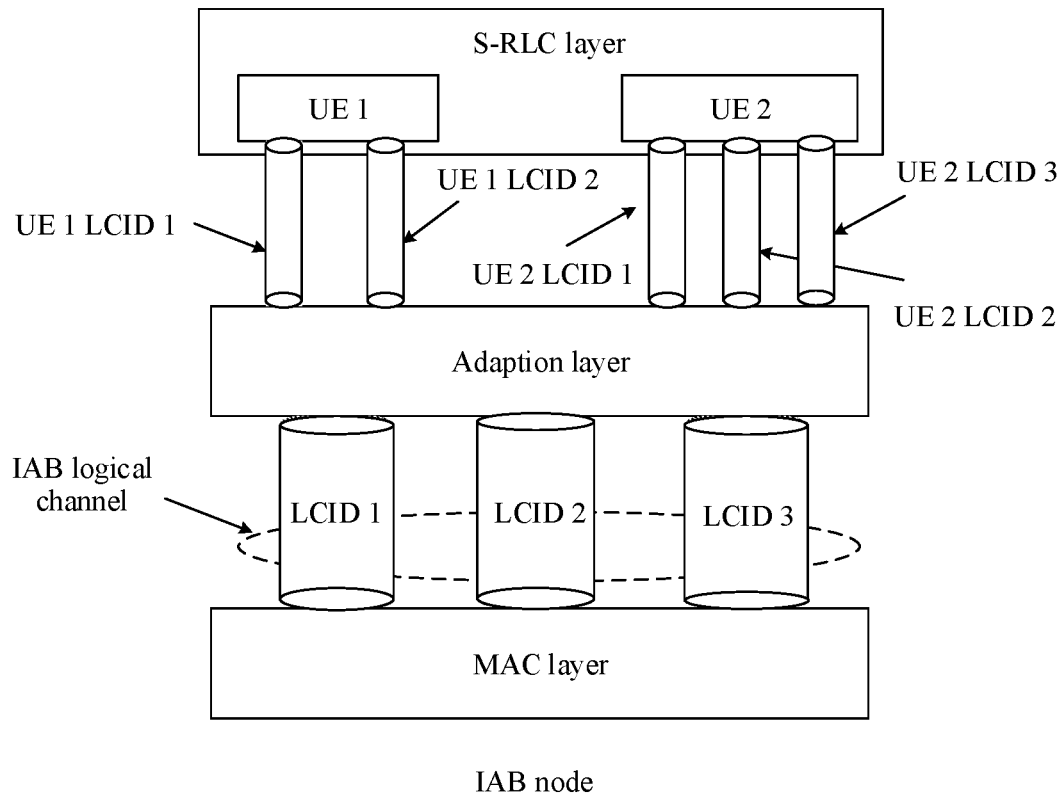
FIG. 9 shows a specific embodiment of bearer mapping according to this application.

A solution shown in FIG. 9 is optimized based on the solution shown in FIG. 7A, FIG. 7B, and FIG. 7C, that is, a one-to-one mapping method is used on a Un interface. For example, a UE DRB 1 on a Uu interface is fixedly mapped onto an IAB 1 DRB 1 that is on a Un 1 interface, and a UE DRB 2 on the Uu interface is fixedly mapped onto an IAB 1 DRB 2 that is on the Un 1 interface. In addition, the UE DRB 1 on the Uu interface is fixedly mapped onto an IAB 2 DRB 1 on a Un 2 interface, and the UE DRB 2 on the Uu interface is fixedly mapped onto an IAB 2 DRB 2 on the Un 2 interface. It may be understood that DRBs on interfaces are in a one-to-one correspondence with logical channels (LCH) on the interfaces. In this case, a mapping relationship between the UE DRB and the DRB on the Un interface may also be a one-to-one fixed mapping relationship between the logical channel of the UE on the Uu interface and the logical channel of the IAB on the Un interface. Further, on the Un interface, service flows of different UEs may be aggregated on a bearer of an IAB node.

As shown in FIG. 9, UE 1 has two service flows on a Uu interface, and the two service flows are respectively mapped onto a UE 1 DRB 1 and a UE 1 DRB 2 on a Uu interface, where the UE 1 DRB 1 corresponds to a logical channel LCH 1 of the UE 1, and the UE 1 DRB 2 corresponds to a logical channel LCH 2 of the UE 1. The LCH 1 is identified by using an LCID (LCID) 1, and the LCH 2 is identified by using an LCID 2.

UE 2 has three service flows on a Uu interface, and the three service flows are respectively mapped onto a UE 2 DRB 1, a UE 2 DRB 2, and a UE 2 DRB 3 on a Uu interface, where the UE 2 DRB 1 corresponds to a logical channel LCH 1 of the UE 2, the UE 2 DRB 2 corresponds to a logical channel LCH 2 of the UE 2, and the UE 2 DRB 3 corresponds to a logical channel LCH 3 of the UE 2. The LCH 1 is identified by using an LCID 1, the LCH 2 is identified by using an LCID 2, and the LCH 3 is identified by using an LCID 3.

On the Un interface, the IAB node sets up three user plane bearers: an IAB DRB 1, an IAB DRB 2, and an IAB DRB 3, where the IAB DRB 1 corresponds to a logical channel LCH 1 of the IAB, the IAB DRB 2 corresponds to a logical channel LCH 2 of the IAB, and the IAB DRB 3 corresponds to a logical channel LCH 3 of the IAB. The LCH 1 is identified by an LCID 1, the LCH 2 is identified by an LCID 2, and the LCH 3 is identified by an LCID 3.

Therefore, in this embodiment of this application, when bearer mapping is performed in a UE service flow transmission process, a one-to-one fixed mapping manner is used. To be specific, service flows transmitted on the UE 1 LCID 1 and the UE 2 LCID 1 are mapped onto the IAB LCID 1 for transmission, service flows transmitted on the UE 1 LCID 2 and the UE 2 LCID 2 are mapped onto the IAB LCID 2 for transmission, and a service flow transmitted on the UE 2 LCID 3 is mapped onto the IAB LCID 3 for transmission. This fixed mapping manner is used, so that a large quantity of signaling overheads are reduced.

Figure 10:
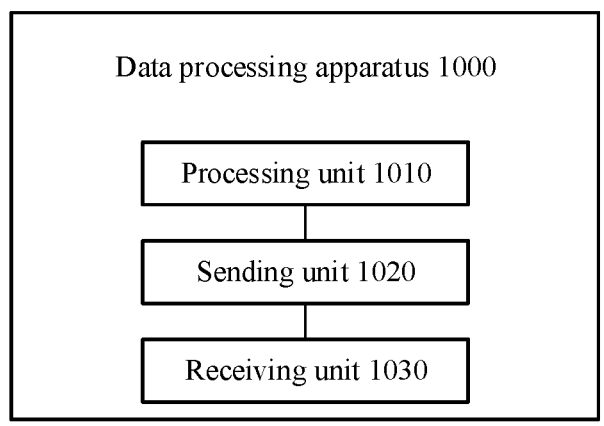
FIG. 10 shows a schematic block diagram of a data processing apparatus according to an embodiment of this application.

FIG. 10 is a schematic block diagram of a data processing apparatus 1000 in an integrated access and backhaul IAB system according to an embodiment of this application. The IAB system includes a centralized unit CU, a distributed unit DU, a first IAB node, and a second IAB node. The apparatus 1000 includes a processing unit 1010, a sending unit 1020, and a receiving unit 1030.

In an example, the apparatus 1000 may be a CU.

In an embodiment of this application, when the apparatus 1000 is a CU, the processing unit 1010 is configured to generate a downlink F1AP message. A message included in the downlink F1AP message is one or a combination of the following: an F1AP message of a terminal device, an F1AP message of the first IAB node, and an RRC message of the second IAB node. The sending unit 1020 is configured to send the downlink F1AP message to the DU, and indicate that a message type of the message included in the downlink F1AP message is one of the following: an RRC message type, an F1AP message type, or an RRC message type and an F1AP message type.

In a possible implementation, the sending unit 1020 is further configured to send indication information to the DU, where the indication information indicates the message type. The indication information is carried in the downlink F1AP message or carried on a peer adaptation layer on an F1 interface between the CU and the DU.

In a possible implementation, the sending unit 1020 is specifically configured to send the downlink F1AP message through a GTP tunnel specific to the message type to the DU, to indicate to the DU that the downlink F1AP message is transmitted through the specific GTP tunnel.

In another embodiment of this application, when the apparatus 1000 is a CU, the receiving unit 1030 is configured to receive an uplink F1AP message sent by the DU, where a message included in the uplink F1AP message is one or a combination of the following: an F1AP message of a terminal device, an F1AP message of the first IAB node, and an RRC message of the second IAB node. The receiving unit 1030 is further configured to receive indication information sent by the DU, where the indication information indicates that a message type of the message included in the uplink F1AP message is one of the following: an RRC message type, an F1AP message type, or an RRC message type and an F1AP message type.

In a possible implementation, the indication information is carried in the uplink F1AP message or on a peer adaptation layer on an F1 interface between the CU and the DU.

In a possible implementation, when the message type of the message included in the uplink F1AP message is the RRC message type, the processing unit 1010 obtains the RRC message of the second IAB node, and processes the RRC message of the second IAB node on a peer RRC layer between the CU and the second IAB node.

In a possible implementation, when the message type of the message included in the uplink F1AP message is the F1AP message type, the processing unit 1010 obtains an F1AP message included in the uplink F1AP message, and determines that the F1AP message included in the uplink F1AP message is the F1AP message of the terminal device or the F1AP message of the first IAB node.

In a possible implementation, if the F1AP message included in the uplink F1AP message is the F1AP message of the terminal device, the processing unit 1010 processes the F1AP message of the terminal device on a peer F1AP layer between the CU and the terminal device; or if the F1AP message included in the uplink F1AP message is the F1AP message of the first IAB node, the processing unit 1010 processes the F1AP message of the first IAB node on a peer F1AP layer between the CU and the first IAB node.

In another example, the apparatus 1000 is the second IAB node.

In an embodiment of this application, when the apparatus 1000 is a second IAB node, the receiving unit 1030 is configured to receive a downlink message sent by the DU, and when the downlink message is carried on a signaling radio bearer between the second IAB node and the DU, the second IAB node further receives indication information sent by the DU, where the indication information indicates that a message type of the downlink message is an RRC message type or an F1AP message type.

The processing unit 1010 is configured to determine, based on the received downlink message, whether the downlink message belongs to the second IAB node, and if the downlink message belongs to the second IAB node, the second IAB node processes the downlink message; otherwise, the second IAB node further routes the received downlink message to a next-hop node for processing.

In another embodiment of this application, when the apparatus 1000 is a second IAB node, the sending unit 1020 is configured to send an uplink message to the DU.

If the uplink message is carried on a signaling radio bearer between the second IAB node and the DU, the second IAB node indicates that a message type of the uplink message is an RRC message type or an F1AP message type to the DU.

In another embodiment of this application, when the apparatus 1000 is a CU, the processing unit 1010 is configured to determine a mapping relationship between a data radio bearer DRB on an air interface and a DRB on a first interface and a mapping relationship between the DRB on the first interface and a DRB on a second interface based on a QoS parameter of service data, where the first interface is an interface between the first IAB node and the second IAB node, and the second interface is an interface between the second IAB node and the DU.

The sending unit 1020 is configured to notify the first IAB node of the mapping relationship between the DRB on the air interface and the DRB on the first interface, and notify the second IAB node of the mapping relationship between the DRB on the first interface and the DRB on the second interface.

In another embodiment of this application, when the apparatus 1000 is a CU, the processing unit 1010 is configured to determine a mapping relationship between a data radio bearer DRB on an air interface and a DRB on a first interface and a mapping relationship between the DRB on the first interface and a DRB on a second interface based on a QoS parameter of service data, where the first interface is an interface between the first IAB node and the second IAB node, and the second interface is an interface between the second IAB node and the DU.

The sending unit 1020 is configured to notify the second IAB node of the mapping relationship between the DRB on the air interface and the DRB on the first interface and the mapping relationship between the DRB on the first interface and the DRB on the second interface.

In another embodiment of this application, when the apparatus 1000 is a first IAB node, the receiving unit 1030 is configured to receive, from the CU, a DRB on a first interface and a QoS parameter corresponding to the DRB, and a DRB on an air interface and a QoS parameter corresponding to the DRB.

The processing unit 1010 is configured to determine a mapping relationship between the DRB on the air interface and the DRB on the first interface based on the QoS parameter corresponding to the DRB on the first interface and the QoS parameter corresponding to the DRB on the air interface.

The first interface is an interface between the first IAB node and the second IAB node.

In another embodiment of this application, when the apparatus 1000 is a second IAB node, the receiving unit 1030 is configured to receive, from the CU, a data radio bearer DRB on a first interface and a QoS parameter corresponding to the DRB, and a DRB on a second interface and a QoS parameter corresponding to the DRB.

The processing unit 1010 is configured to determine a mapping relationship between the DRB on the first interface and the DRB on the second interface based on the QoS parameter corresponding to the data radio bearer DRB on the first interface and the QoS parameter corresponding to the DRB on the second interface.

The first interface is an interface between the first IAB node and the second IAB node. The second interface is an interface between the second IAB node and the DU.

In another embodiment of this application, when the apparatus 1000 is a second IAB node, the receiving unit 1030 is configured to receive, from the CU, a DRB on a first interface, a QoS parameter corresponding to the DRB, a service identity of a terminal, and a service QoS parameter corresponding to the service identity.

The processing unit 1010 is configured to determine a mapping relationship between a terminal service corresponding to the service identity and the DRB on the first interface based on the QoS parameter corresponding to the DRB on the first interface and the QoS parameter corresponding to the service identity of the terminal.

The first interface is an interface between the first IAB node and the second IAB node.

In another embodiment of this application, when the apparatus 1000 is a first IAB node, the receiving unit 1030 is configured to receive, from the CU, a DRB on an air interface, a QoS parameter corresponding to the DRB, a service identity of a terminal, and a service QoS parameter corresponding to the service identity.

The processing unit 1010 is configured to determine a mapping relationship between a terminal service corresponding to the service identity and the DRB on the air interface based on the QoS parameter corresponding to the DRB on the air interface and the QoS parameter corresponding to the service identity of the terminal.

In another embodiment of this application, when the apparatus 1000 is a second IAB node, the receiving unit 1030 is configured to receive, from the CU, a mapping relationship between a DRB on a second interface and a QoS parameter corresponding to the DRB, a service identity of a terminal, and a service QoS parameter corresponding to the service identity.

The processing unit 1010 is configured to determine a mapping relationship between a terminal service corresponding to the service identity and the DRB on the second interface based on the QoS parameter corresponding to the DRB on the second interface and the QoS parameter corresponding to the service identity of the terminal.

The second interface is an interface between the second IAB node and the DU.

In another embodiment of this application, when the apparatus 1000 is a first IAB node, the receiving unit 1030 is configured to receive, by the first IAB node from the CU, a DRB on a first interface, a QoS parameter corresponding to the DRB, a service identity of a terminal, and a service QoS parameter corresponding to the service identity.

The processing unit 1010 is configured to determine a mapping relationship between a terminal service corresponding to the service identity and the DRB on the first interface based on the QoS parameter corresponding to the DRB on the first interface and the QoS parameter corresponding to the service identity of the terminal.

The first interface is an interface between the first IAB node and the second IAB node.

Figure 11:
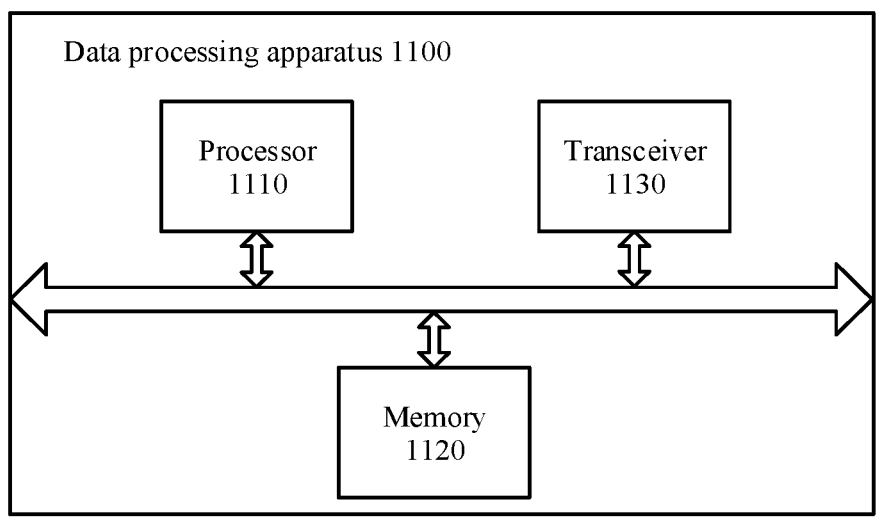
FIG. 11 shows a schematic block diagram of another data processing apparatus according to an embodiment of this application.

It should be noted that in this embodiment of the present invention, the processing unit 1010 may be implemented by a processor, and the sending unit 1020 and the receiving unit 1030 may be implemented by a transceiver. As shown in FIG. 11, the data processing apparatus 1100 may include a processor 1110, a memory 1120, and a communications interface 1130. The memory 1120 may be configured to store an instruction, code, or the like executed by the processor 1110. When the instruction or the code is executed, the processor 1110 is configured to perform the method provided in the foregoing method embodiment, and the processor 1110 is further configured to control the communications interface 1130 to communicate with the outside.

In an implementation process, steps in the foregoing methods can be implemented by using a hardware integrated logical circuit in the processor 1110, or by using instructions in a form of software. The steps of the method disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1120, and the processor 1110 reads information in the memory 1120 and completes the steps in the foregoing methods in combination with hardware of the processor. To avoid repetition, details are not described herein again.

It should be understood that the data processing apparatus 1000 shown in FIG. 10 or the data processing apparatus 1100 shown in FIG. 11 can implement processes corresponding to the CU in the foregoing method embodiments. Specifically, for the data processing apparatus 1000 or the data processing apparatus 1100, refer to the foregoing description of the CU. To avoid repetition, details are not described herein again.

It should be further understood that the data processing apparatus 1000 shown in FIG. 10 or the data processing apparatus 1100 shown in FIG. 11 can implement processes corresponding to the first IAB node in the foregoing method embodiments. Specifically, for the data processing apparatus 1000 or the data processing apparatus 1100, refer to the foregoing description of the first IAB node. To avoid repetition, details are not described herein again.

It should be further understood that the data processing apparatus 1000 shown in FIG. 10 or the data processing apparatus 1100 shown in FIG. 11 can implement processes corresponding to the second IAB node in the foregoing method embodiments. Specifically, for the data processing apparatus 1000 or the data processing apparatus 1100, refer to the foregoing description of the second IAB node. To avoid repetition, details are not described herein again.

It should be further understood that the data processing apparatus 1000 shown in FIG. 10 or the data processing apparatus 1100 shown in FIG. 11 can implement processes corresponding to the DU in the foregoing method embodiments. Specifically, for the data processing apparatus 1000 or the data processing apparatus 1100, refer to the foregoing description of the DU. To avoid repetition, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

An embodiment of this application further provides a computer-readable storage medium, including a computer program. When the computer program is run on a computer, the computer is enabled to perform the method provided in the foregoing method embodiments.

An embodiment of this application further provides a computer program product including an instruction. When the computer program product runs on a computer, the computer is enabled to perform the method provided in the foregoing method embodiments.

It should be understood that, the processor mentioned in the embodiments of the present invention may be a central processing unit (CPU), or may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be further understood that the memory mentioned in the embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA, or another programmable logic device, discrete gate or transistor logic device, or discrete hardware component, the memory (storage module) is integrated into the processor.

It should be noted that the memory described in this specification is intended to include but is not limited to these and any memory of another appropriate type.

It should be further understood that first, second, and various numerical numbers in this specification are merely for differentiation for ease of description, but are not intended to limit the scope of this application.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method in an integrated access and backhaul (IAB) system, wherein the system comprises a centralized unit (CU) and a distributed unit (DU) located in an IAB donor, a first IAB node, and a second IAB node, and the method comprises:
    generating, by the CU, a downlink F1 Application Protocol (F1AP) message, wherein a message comprised in the downlink F1AP message is one or a combination of the following: an F1AP message of a terminal device, an F1AP message of the first IAB node, and an RRC message of the second IAB node; and
    sending, by the CU, the downlink F1AP message to the DU, and indicating that a message type of the message comprised in the downlink F1AP message is one of the following: an RRC message type, an F1AP message type, or an RRC message type and an F1AP message type,
    wherein the indicating comprises (1) sending, by the CU, indication information carried in the downlink F1AP message or carried on a peer adaptation layer on an F1 interface between the CU and the DU, the indication information indicating the type of message, or (2) sending, by the CU, the downlink F1AP message through a GTP tunnel to the DU, a type of the GTP tunnel being specific to the type of message.

2. The method according to claim 1, wherein the indicating comprises sending, by the CU, indication information carried in the downlink F1AP message or carried on a peer adaptation layer on an F1 interface between the CU and the DU, the indication information indicating the type of message.

3. The method according to claim 1, wherein the indicating comprises sending, by the CU, the downlink F1AP message through a GTP tunnel to the DU, a type of the GTP tunnel being specific to the type of message.

4. A data processing method in an integrated access and backhaul (IAB) system, wherein the system comprises a centralized unit (CU) and a distributed unit (DU) located in an IAB donor, a first IAB node, and a second IAB node, and the method comprises:
- receiving, by the CU, an uplink F1 Application Protocol (F1AP) message sent by the DU, wherein a message comprised in the uplink F1AP message is one or a combination of the following: an F1AP message of a terminal device, an F1AP message of the first IAB node, and an RRC message of the second IAB node; and
- receiving, by the CU, indication information sent by the DU, wherein the indication information, carried in the uplink F1AP message or carried on a peer adaptation layer on an F1 interface between the CU and the DU, indicates that a message type of the message comprised in the uplink F1AP message is one of the following: an RRC message type, an F1AP message type, or an RRC message type and an F1AP message type.

5. The method according to claim 4, wherein the method further comprises:
- when the message type indicated by the indication information is the RRC message type, obtaining, by the CU, the RRC message of the second IAB node, and processing the RRC message of the second IAB node on a peer RRC layer between the CU and the second IAB node.

6. The method according to claim 4, wherein the method further comprises:
- when the message type indicated by the indication information is the F1AP message type, obtaining, by the CU, an F1AP message comprised in the uplink F1AP message, and determining that the F1AP message comprised in the uplink F1AP message is the F1AP message of the terminal device or the F1AP message of the first IAB node.

7. The method according to claim 6, wherein the method further comprises:
- if the F1AP message comprised in the uplink F1AP message is the F1AP message of the terminal device, processing, by the CU, the F1AP message of the terminal device on a peer F1AP layer between the CU and the terminal device.

8. The method according to claim 6, wherein the method further comprises:
- if the F1AP message comprised in the uplink F1AP message is the F1AP message of the first IAB node, processing, by the CU, the F1AP message of the first IAB node on a peer F1AP layer between the CU and the first IAB node.

9. An integrated access and backhaul (IAB) system comprising a centralized unit (CU) and a distributed unit (DU) located in an IAB donor, wherein:
- the CU is configured to generate a downlink F1 Application Protocol (F1AP) message, wherein a message comprised in the downlink F1AP message is one or a combination of the following: an F1AP message of a terminal device, an F1AP message of a first IAB node, and an RRC message of a second IAB node;
- the CU is configured to send the downlink F1AP message to the DU, and indicate that a message type of the message comprised in the downlink F1AP message is one of the following: an RRC message type, an F1AP message type, or an RRC message type and an F1AP message type,
- wherein the CU is further configured to (1) send indication information carried in the downlink F1AP message or carried on a peer adaptation layer on an F1 interface between the CU and the DU, the indication information indicating the type of message, or (2) send the downlink F1AP message through a GTP tunnel to the DU, a type of the GTP tunnel being specific to the type of message; and
- the DU is configured to receive the downlink F1AP message.

10. The system according to claim 9, wherein the CU is configured to send indication information carried in the downlink F1AP message or carried on a peer adaptation layer on an F1 interface between the CU and the DU, the indication information indicating the type of message.

11. The system according to claim 9, wherein the CU is configured to send the downlink F1AP message through a GTP tunnel to the DU, a type of the GTP tunnel being specific to the type of message.

12. An integrated access and backhaul (IAB) system comprising a centralized unit (CU) and a distributed unit (DU) located in an IAB donor, wherein:
- the DU is configured to send an uplink F1 Application Protocol (F1AP) message;
- the CU is configured to receive the uplink F1AP message sent by the DU, wherein a message comprised in the uplink F1AP message is one or a combination of the following: an F1AP message of a terminal device, an F1AP message of the first IAB node, and an RRC message of the second IAB node; and
- receiving, by the CU, indication information sent by the DU, wherein the indication information, carried in the uplink F1AP message or carried on a peer adaptation layer on an F1 interface between the CU and the DU, indicates that a message type of the message comprised in the uplink F1AP message is one of the following: an RRC message type, an F1AP message type, or an RRC message type and an F1AP message type.

13. The system according to claim 12, wherein
the CU is configured to obtain the RRC message of the second IAB node when the message type of the message indicated by the indication information is the RRC message type, and process the RRC message of the second IAB node on a peer RRC layer between the CU and the second IAB node.

14. The system according to claim 12, wherein
the CU is configured to obtain an F1AP message comprised in the uplink F1AP message when the message type indicated by the indication information is the F1AP message type, and determine that the F1AP message comprised in the uplink F1AP message is the F1AP message of the terminal device or the F1AP message of the first IAB node.

15. The system according to claim 14, wherein
the CU is configured to process the F1AP message of the terminal device on a peer F1AP layer between the CU and the terminal device if the F1AP message comprised in the uplink F1AP message is the F1AP message of the terminal device.

16. The method according to claim 14, wherein the CU is configured to process the F1AP message of the first IAB node on a peer F1AP layer between the CU and the first IAB node if the F1AP message comprised in the uplink F1AP message is the F1AP message of the first IAB node.

* * * * *